United States Patent [19]

Elward-Berry

[11] Patent Number: 5,179,076
[45] Date of Patent: Jan. 12, 1993

[54] RHEOLOGICALLY-STABLE WATER-BASED HIGH TEMPERATURE DRILLING FLUID

[75] Inventor: Julianne Elward-Berry, Houston, Tex.

[73] Assignee: Exxon Production Research Company, Houston, Tex.

[21] Appl. No.: 531,981

[22] Filed: Jun. 1, 1990

[51] Int. Cl.$^5$ .............................................. C09K 7/02
[52] U.S. Cl. ................................................. 507/112
[58] Field of Search ................. 252/8.51, 8.513, 8.514; 507/112

[56] References Cited

U.S. PATENT DOCUMENTS

| | | |
|---|---|---|
| 2,319,705 | 5/1943 | Post et al. |
| 2,582,323 | 1/1952 | Fisher |
| 2,749,309 | 6/1956 | Heritage |
| 2,912,380 | 11/1959 | Groves |
| 3,042,608 | 7/1962 | Morris |
| 3,954,628 | 5/1976 | Sauber et al. |
| 4,088,583 | 5/1978 | Pyle et al. |
| 4,123,366 | 10/1978 | Sauber et al. |
| 4,142,595 | 3/1979 | Anderson et al. |
| 4,290,899 | 9/1981 | Malone et al. |
| 4,561,985 | 12/1985 | Glass, Jr. |
| 4,619,773 | 10/1986 | Heilwell et al. |
| 4,629,575 | 12/1986 | Weibel et al. |

FOREIGN PATENT DOCUMENTS 2120708B 2/1986 United Kingdom.
2209780A 5/1989 United Kingdom.

OTHER PUBLICATIONS

Holder, Barry J., "Drilling Fluids for High Temperature Wells in South East Asia", 6th SPE Offshore South East Asia Conference (Singapore, 86.01.28-31) Preprints pp. 422-425, 1986.

Aung, Tun H., "High Temperature Drilling Fluids in the Cooper-Eromanga Basin, Australia", 6th SPE Offshore South East Asia Conf. (Singapore, 86.01.28-31) Preprints pp. 411-421, 1986.

Hille, M. E., "Chemicals for Water-Based Drilling Fluids and Their Temperature Limitations" Chemicals in the Oil Industry (Bood: ISBN 0-85186-885-1) Royal Soc Chem, London; pp. 11-21, 1983 (Royal Soc Chem N W Reg Ind Div Symp.).

Kirton, Bill and Hodges, Charles, "Low Colloid Water Base Drilling Fluid Solves High-Temperature Problems", Drilling Magazine, V42, No. 10, pp. 104, 107-108, Jul. 1981.

Sandia Laboratories, "Evaluation of Commercially Available Geothermal Drilling Fluids", SAND-77-7001, pp. 1-186, Nov. 1976.

HP-007 TM Polymer, Aqualon Brochure.

Remont, Larry J.; Rehm, William A.; McDonald, William M.; and Maurer, William C., "Evaluation of Commercially Available Geothermal Drilling Fluids," issued by Sandia Laboratories, operated for the United States Energy Research and Development Administration (Nov. 1, 1976).

*Primary Examiner*—Gary L. Geist
*Attorney, Agent, or Firm*—Susan A. McLean

[57] ABSTRACT

A water-based fluid for use in the drilling of wells is disclosed. This fluid: is rheologically stable over a wide temperature range, from room temperature to at least about 475° F., thus reducing drilling time in high temperature applications; typically necessitates minimal disposal rates in operation; is resistant to temperature-induced carbonate gellation; creates a thin filter cake; and combines the low toxicity of a water-based fluid with the performance stability of an oil-based fluid.

As further disclosed herein, this drilling fluid comprises a water-based colloidal suspension of certain readily available drilling fluid components, including clay, parenchymal cell cellulose ("PCC") and an inorganic salt.

11 Claims, 27 Drawing Sheets

RHEOLOGICALLY-STABLE WATER-BASED HIGH TEMPERATURE DRILLING FLUID

FIELD OF THE INVENTION

This invention pertains to water-based drilling fluids that retain rheological stability over a range of temperatures from ambient to in excess of 475° F.

DESCRIPTION OF THE RELATED ART

It is well known in the art that drilling fluids must be used in connection with the drilling of wells, such as those in the oil and gas industry. Such fluids, or "muds," serve several functions in the drilling process. These functions include: removal of drilled cuttings, suspension of high specific gravity weight material and fine cuttings, sealing of the sides of the wellbore so as to minimize drilling fluid loss into the formation, provision of a hydrostatic head to prevent blowouts from high pressure fluids into the wellbore or up through the wellbore to the surface, creation of a low-friction surface on the wellbore to facilitate rotation and removal of the drill string as operational conditions require, cooling of the drill bit and lubrication to prevent the drill pipe from sticking during rotation.

An excellent background document summarizing the composition and use of drilling fluids is Remont, Larry J.; Rehm, William A.; McDonald, William M.; and Maurer, William C., "Evaluation of Commercially Available Geothermal Drilling Fluids," issued by Sandia Laboratories, operated for the United States Energy Research and Development Administration (Nov. 1, 1976) (hereinafter referred to as "Remont et al."). Remont et al. is incorporated herein in full by reference.

Drilling muds are typically colloidal suspensions of certain viscosifiers and filtration control materials, such as clays, as well as of fine drilled solids, in either oil or water. Typical clay concentrations in drilling muds range from about 10 to about 50 lb/bbl. Various chemicals are added to alter, enhance, influence or modify the properties of the suspension, as is well known in the art. For example, a weighting agent, such as barium sulfate, or "barite," is added to increase the density of the mud. Viscosifiers are used to increase viscosity and gel strength. Deflocculants, such as lignosulfonates, prevent the clay particles from forming, which flocs contribute to an increase in viscosity. Filtration control materials, such as soluble polymers or starch, are added to encourage the development of the filter cake on the sides of the wellbore so that a minimal amount of the drilling fluid will enter a permeable formation.

The search for oil and gas has led to the drilling of deeper wells in recent years. Because of the temperature gradient in the earth's crust, deeper wells have higher bottomhole temperatures. As is well known in the art and confirmed by Remont et al., there is a need for a drilling fluid which retains rheological stability throughout a broad temperature range for efficient drilling of these deeper wells.

Because of their better thermal stability as compared to water-based fluids, oil-based fluids typically have been used in high temperature applications. However, as the environmental impact of the disposal of these spent slurries, and the drilled cuttings carried in these slurries, has become increasingly scrutinized, water-based fluids have become more and more the fluid of choice in the industry. Water-based fluids are also preferable in high pressure applications, such as deep wells, because oil-based fluids are more compressible than water-based fluids. This increased compressibility results in increased viscosity.

For a mud to work well in high temperature bottomhole conditions, it must be rheologically stable over the entire range of temperatures to which it will be exposed. This range is generally from ambient temperature to bottomhole temperature. The rheological stability of a mud is monitored by measuring its yield point and gel strengths, in accordance with standard drilling fluid tests, before and after circulation down the wellbore. These standard tests, which include the tests for yield point and gel strengths, are well known in the industry and are described in "Recommended Practice Standard Procedure for Field Testing Water-Based Drilling Fluids," Recommended Practice 13B-1 (1st ed. Jun. 1, 1990), American Petroleum Institute (hereinafter referred to as "RP 13B-1").

The major operational difficulty presented by a typical water-based mud at higher temperatures is that at such temperatures it degrades and becomes too viscous to be circulated easily. This circulation difficulty arises because the clays used in the muds are susceptible to temperature-induced gellation at temperatures as low as about 250° F. The circulation problems caused by the increased viscosity of the muds at higher temperatures are exacerbated during those time periods when drilling and circulation must be discontinued.

The prior art has several partial solutions to this high temperature difficulty, none of which is completely satisfactory. These solutions include: excessive dilution and dumping of spent fluids, addition of rheology-modifying chemicals, use of polymers instead of clay as viscosifiers, and use of a foam drilling fluid. Dilution and dumping is not acceptable because it is expensive, requiring rebuilding of substantial fractions of the fluid system, and resulting in potentially large disposal costs. Addition of rheology-modifying chemicals only marginally elevates the temperature at which gellation initiates. Polymers used as viscosifiers are not acceptable in applications above approximately 250° F. to 300° F. due to the extreme degradation of the polymers, resulting in substantial loss of viscosity. Finally, water soluble foams are sometimes used for high temperature applications, but due to their low density they are ineffective for weighting or sealing and thus are not practical for use in situations where there is a large amount of water intrusion. They also have poor lubricating qualities and tend to be corrosive.

Recently, U.S. Pat. No. 4,629,575 to Weibel, which patent is incorporated herein by reference, has disclosed that parenchymal cell cellulose ("PCC") can be beneficially used in high temperature drilling fluids as a viscosifier; however, Weibel teaches that, due to thermal degradation, PCC is not effective as the sole viscosifier of a drilling fluid in high temperature applications above about 350° F. Therefore, there remains a need for a drilling fluid which remains rheologically stable through a wide temperature range, from ambient temperature to above about 475° F.

SUMMARY OF THE INVENTION

This invention relates to water-based drilling fluids which display rheological stability throughout a wide temperature range. Although throughout this disclosure the phrase "the mud of this invention," or similar phrases, are used, it is to be understood that this invention encompasses a broad range of muds. Such phrases indicate a drilling fluid prepared in accordance with the methods taught herein. "Rheological stability" means that the effective viscosity at annular shear rate of the mud remains within an effective, relatively narrow range, between about 25 cp. and about 150 cp., but preferably between about 50 cp. and about 100 cp., over a broad temperature range, from ambient temperature to at least 475° F. This rheological stability enables the fluid to carry drilled cuttings efficiently at ambient temperatures. It also provides a sufficiently fluid viscosity at higher (bottomhole) temperatures to provide ease of circulation downhole. This invention also teaches the method for preparing and mixing the critical components of such a fluid, and a method for this fluid's use as a drilling mud.

The preferred drilling fluid comprises three components: clay, inorganic salt such as a chloride salt or a sulfate salt (or other such inorganic salts as are known in the art), and PCC. PCC was discussed above. The three components are preferably pretreated and then combined in proportions which result in a drilling fluid having the following characteristics: a yield point of about 10 lb/100ft$^2$ to about 25 lb/100ft$^2$; gel strengths of about 3 lb/100ft$^2$ to about 10 lb/100ft$^2$ for the 10-second measurement, about 10 lb/100ft$^2$ to about 30 lb/100ft$^2$ for the 10-minute measurement, and about 20 lb/100ft$^2$ to about 35 lb/100ft$^2$ for the 30-minute measurement; a high-temperature high-pressure (HTHP) filtration rate of less than about 50 cc/30 min. at 500 psi and 300° F.; and a pH between about 9.0 and about 11.5. These yield point, gel strength, HTHP filtration rate, and pH specifications set forth above relate to measurements made using standard tests for drilling fluids. Such standard tests are set forth in RP 13B-1.

Applicant's laboratory tests have shown that muds having the above characteristics generally comprise: about 2 to about 15 lb/bbl clay; about 5,000 to about 110,000 parts anionic salt species per million parts fluid; and about 1 to about 8 lb/bbl PCC.

The economic impact of this invention is most directly realized by the reduced circulating and conditioning times, hence shortened drilling times, realized because of the ease of circulating the drilling fluid at elevated temperatures. Further, use of the drilling fluid of this invention results in reduced dilution, dumping and makeup. This reduced dilution, dumping and makeup results in savings not only in the purchase of components for this fluid, but also in the cost of disposal of the spent fluid. This reduced disposal volume makes this fluid not only economically but also environmentally attractive. Another significant benefit of the mud of this invention is that its preparation is simpler than the preparation of a typical mud of the prior art. Additionally, the toxicity of the spent fluid is lower than that of those fluids typically used in high temperature applications, especially oil-based fluids. Furthermore, the mud of this invention typically lays down a filter cake one-half to one-third as thick as the filter cakes typically laid down by the muds of the prior art, minimizing the potential for the drill pipe to become stuck. Finally, the mud of this invention is a mud with reduced potential for temperature-induced carbonate gellation.

These and other benefits of this invention will be apparent in reviewing this disclosure, the descriptions of the various embodiments of this invention, and the claims herein.

DESCRIPTION OF THE PREFERRED EMBODIMENT

Figure 1A:
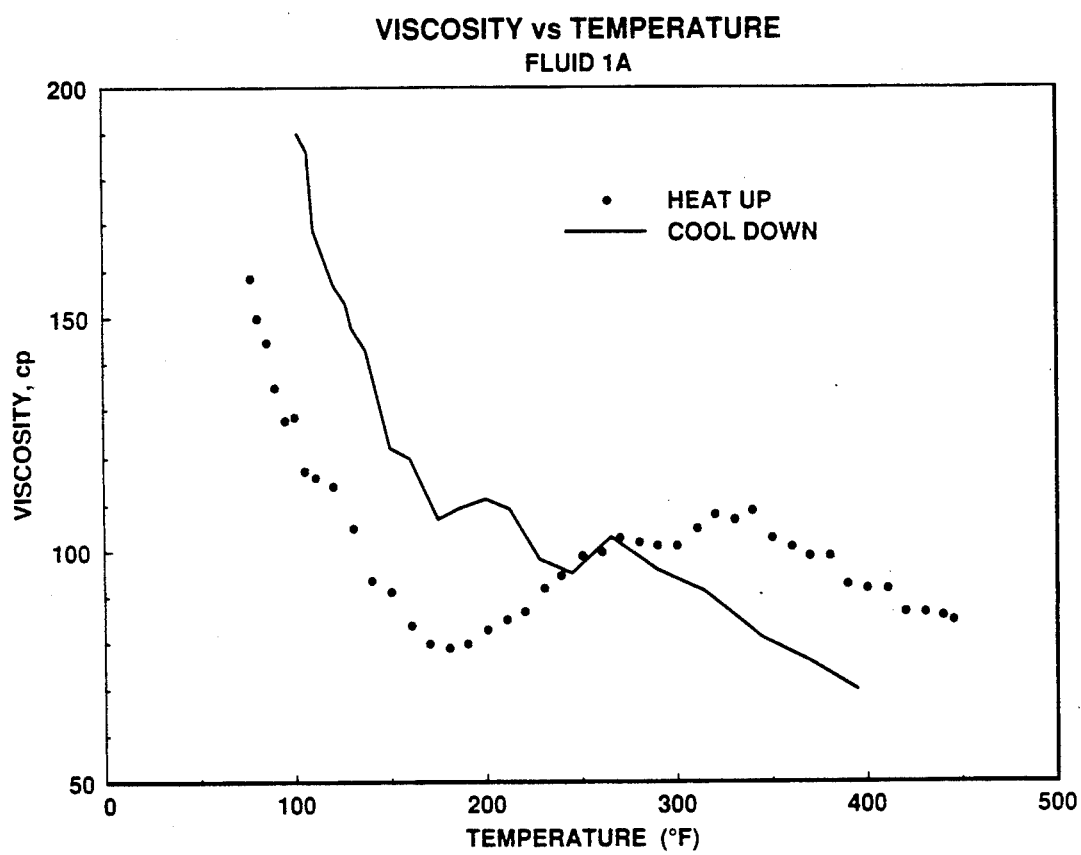
FIGS. 1A and 1B are graphs used to compare the viscosities over a broad temperature range of two muds, one with prescribed amounts of clay, PCC and chloride, and the other identical to the first but with no chloride, as discussed in Example 1. This comparison demonstrates the need for inorganic salt in the mud to stabilize the rheology of the mud.

For years there has been a need for a water-based, rheologically stable drilling fluid for high temperature applications. Applicant's invention is a water-based slurry comprising three essential components, resulting in a drilling fluid having rheological stability. This broad temperature stability is created from the synergistic combination of the three components, and makes it unnecessary to add significant amounts of other rheology-modifying additives. However, deflocculants and other additives typically used in drilling muds can be beneficially added where needed, using techniques commonly known in the art. This invention is directed to adjusting and stabilizing the rheology and filtration of the drilling fluid with respect to temperature.

The three essential components are:

1. Good quality clay, such as bentonite, or any other clays as are used in the art, at about 2 to about 15 lb/bbl. The specifications for bentonite as used in drilling fluids are set forth in "Specification for Oil-Well Drilling-Fluid Materials," API Specification 13A (12th ed. Oct., 1988), American Petroleum Institute (hereinafter referred to as "Spec 13A"). Spec 13A sets forth specifications for both bentonite and nontreated bentonite. Either of these, as well as other clays as are used in the art, can be used in the mud of this invention. In the preferred embodiment, nontreated bentonite should be used in a concentration of 5 to 10 lb/bbl. This nontreated bentonite should be prehydrated in fresh water, in a concentration of 20 to 25 lb/bbl, preferably with no additives, for a minimum of four hours. Prehydration can also be accomplished outside of this concentration range or in a different amount of time.

2. A PCC viscosifier at about 1 to about 8 lb/bbl. In the preferred embodiment, presheared PCC should be used in a concentration of 1 to 3 lb/bbl. Preshearing of the PCC is best accomplished in the laboratory by mixing 20 lb/bbl of PCC with fresh water or sea water, then using a laboratory grade blender at high speed for 15 to 30 minutes until the yield point of the slurry is at least about 70 lb/100ft$^2$. For applications in the field, PCC is best presheared by mixing 20 lb/bbl PCC with fresh water or sea water, then circulating this slurry through a colloid mill or a modified homogenizer pump for a minimum of two hours, until the yield point of the slurry is at least about 70 lb/100ft$^2$, as measured by the yield point test of RP 13B-1. Preshearing can also be accomplished outside of this concentration range in a different amount of time, to a lower yield point or with different equipment; the method described above is the preferred embodiment.

3. An inorganic salt, such as a sulfate salt or a chloride salt or other such salts or any combination thereof, at about 5,000 to 110,000 parts anionic salt species per million parts of fluid. In the preferred embodiment, a chloride salt essentially comprising sodium chloride is used and the range is 10,000 to 30,000 parts of chloride per million parts of fluid.

The concentration of each component is customized to the particular application as a function of the drilling fluid density and the bottomhole temperature. Once the bottomhole temperature is known, the necessary density is determined, and a base mud is built using techniques commonly known in the art, this base mud is customized using the following guidelines:

1. The yield point of the fluid is raised to between about 10 lb/100ft$^2$ and about 25 lbs/100ft$^2$, using the standard yield point test of RP 13B-1. In the preferred embodiment, this range is between 15 lbs/100ft$^2$ and 20 lbs/100ft$^2$. Achieving this yield point is accomplished by the addition of clay (preferably prehydrated) as long as the clay concentration is less than 10 lbs/bbl and the gel strengths are within the prescribed range set forth herein. If the clay concentration is greater than about 10 lbs/bbl or the gel strengths are at the maximum of the prescribed range, PCC (preferably presheared), and not clay, is added to raise the yield point.

2. The 10-second, 10-minute and 30-minute gel strengths are measured and adjusted to be between about 3 lbs/100ft$^2$ and about about 10 lbs/100ft$^2$, between about 10 lbs/100ft$^2$ and about 30 lbs/100ft$^2$, and between about 20 lbs/100ft$^2$ and about 35 lbs/100ft$^2$, respectively. In the preferred embodiment, these ranges are 4 lbs/100ft$^2$ to 8 lbs/100ft$^2$, 15 lbs/100ft$^2$ to 25 lbs/100ft$^2$, and 20 lbs/100ft$^2$ to 30 lbs/100ft$^2$, by the addition of clay, preferably prehydrated clay. The gel strengths are measured in accordance with the standard test set forth in RP 13B-1. As a practical matter, bringing the 10-second gel strengths within range will generally result in acceptable 10-minutes and 30-minute gel strength with the mud of this invention. Therefore, it is usually sufficient to measure and adjust only the 10-second gel strength.

3. The filtration rate is adjusted so that the HTHP 300° F. In the preferred embodiment, the HTHP filtration rate should be lowered to less than 20 cc/30 min. at 500 psi and 300° F. This adjustment is accomplished by addition of clay, preferably prehydrated clay, if clay content is 1w (less than about 4 lbs/bbl), or with a temperature stabilize filtration polymer, such as Therma-Chek, Hoatadrill, KemSesl, or other similar materials, otherwise. The HTHP filtration rate is measured via the standard test set forth in RP 13B-1.

4. The pH is adjusted to between about 9.0 and about 1.5. In the preferred embodiment, this range is generally 10.0 to 11.0. This adjustment is accomplished by the addition of alkalinity control materials such as caustic soda or soda ash or other similar materials as are well known in the art. The pH is measured via the standard test set forth in RP 13B-1.

5. The concentration of the anionic salt species is adjusted to between about 5,000 and about 110,000 parts of the anionic salt species per million parts of the fluid. In the preferred embodiment, this range is between 10,000 and 30,000 parts of chloride per million parts of the fluid, where the chloride originates from a chloride salt substantially comprising sodium chloride or from sea water or other brine. This adjustment of the salt concentration is accomplished by addition of an inorganic salt, such as sodium chloride or potassium chloride or sodium sulfate or such other inorganic salts, alone or in combination, as are commonly known in the art. The adjustment can also be accomplished by using sea water or other brine as the base fluid. Where chlorides are used, concentration of the chloride is measured via the standard test set forth in RP 13B-1. Where other inorganic salts are used, concentration of the anionic salt species is determined by use of Merck test trips, a testing method which is well known in the art.

These guidelines may be performed in any order, and the adjustment of any one of these critical properties as described above will not materially affect any of the other critical properties. For example, once the HTHP filtration rate is within range, adjustment of any or all of the other properties in accordance with these guidelines will not place the HTHP filtration rate substantially out of range. This is also true with the yield point, gel strengths, pH, and anionic salt species concentration. In fact, it is a significant benefit of this invention that the adjustment of filtration control, which filtration control is necessary to seal the wellbore and thus minimize fluid loss, is independent of the adjustment of the rheology of the mud of this invention. This benefit substantially simplifies the building of this mud over the building of the muds of the prior art.

As a general matter, as the bottomhole temperature increases, the circulating fluid will require the addition of more filtration control product to maintain the desired HTHP filtration rate. Further, as the density and the temperature of the fluid increase, less clay must be added to the circulating mud to maintain the yield point and/or gel strength within the desired range. Such increases in temperature and density also typically result in the fluid's requiring more inorganic salt to maintain the synergistic effect of this invention.

Unlike the method of preparation of other fluids prepared in accordance with the prior art, no further guidelines are required for the preparation of the mud of this invention. Standard drilling fluid tests, such as Marsh funnel viscosity (FV), Bingham plastic viscosity (PV), room temperature filtration rate (API), filtrate alkalinity tests (Pm, Pf, Mf), and tests of the concentrations of calcium and carbonate, as are set forth in RP 13B-1, may also be performed; however, these measurements are not needed to control the performance of the mud of this invention.

As confirmed by the laboratory tests described in the Examples, PCC (preferably presheared PCC), clay (preferably prehydrated clay), and inorganic salt must all be present to impart high temperature rheological stability. Fluids missing one or more of these three ingredients, or fluids containing all three ingredients but with one or more of these ingredients outside the prescribed ranges, generally do not exhibit the desirable rheological profile.

The benefit achieved from the addition of some level of chlorides and/or other anionic salt species is particularly surprising, as it has long been recognized in the blending of muds that salt intrusion tends to destabilize, rather than stabilize, mud rheology. The prior art frequently focuses on minimizing the concentration of salt in the mud. By sharp contrast, chlorides and/or other anionic salt species are not only beneficial but also necessary for the stability of the mud of this invention.

It is believed that the key to improved temperature stability lies in minimizing the effect of the temperature-induced dispersion of clay packets. High temperature clay dispersion is apparently reduced by reducing the concentration of clay and by deliberately introducing salinity in the form of inorganic salts, the introduction of salinity being contrary to the teaching of prior art. Additional viscosity and filtration control is provided by polymers using techniques well known to one versed in the prior art.

Maintaining the concentration of the clay within a low range (about 2 to about 15 lb/bbl, but in the preferred embodiment 5 to 10 lb/bbl) results in good carrying capacity and suspension under the typical bottomhole conditions. Maintaining a low clay concentration further results in a reduction in the tendency to induce carbonate gellation in the fluid. It is believed that dispersion resistance for both drilled solids and clay is attained by the presence of the anionic salt species in the mud of this invention. Finally, surface rheology and stability is provided by clay (preferably prehydrated) and PCC (preferably presheared), while filtration is controlled by high-temperature filtration polymers interacting with the clay.

EXAMPLES

The following materials were employed in preparing the fluids discussed in the Examples:

Prehydrated Clay

Aquagel, a bentonite clay manufactured bentonite clay manufactured according to Spec 13A, both manufactured by Baroid Drilling Fluids, Inc., prehydrated using the technique specified above.

Presheared PCC

HP-007, manufactured by Aqualon Company, presheared using the technique described above.

Drilled Solids

Rev-Dust, manufactured by Milwhite Co., Inc.; dry Aquagel, manufactured by Baroid Drilling Fluids, Inc.; or ground Panther Creek shale.

Deflocculants

Desco CF, manufactured by Drilling Specialities Company; Miltemp, manufactured by Milpark Drilling Fluids; Therma-Thin, manufactured by Baroid Drilling Fluids, Inc.; or Melanex-T or Aktaflo-S, both manufactured by M/I Drilling Fluids Company.

Filtration Control Materials

Therma-Chek or Baranex, both manufactured by Baroid Drilling Fluids, Inc.; Filtrex, KemSeal, Chemtrol X or Pyrotrol, all manufactured by Milpark Drilling Fluids; Lignite or HT Rez, both manufactured by M/I Drilling Fluids Company; or Soltex or Dristech HTHP, both manufactured by Drilling Specialties Company.

Inorganic Salt

Industrial grade sack salt comprising substantially sodium chloride, or Sea-Salt, manufactured by Lake Chemical Company.

Barite

A commercial API specification grade of barium sulfate, meeting the specifications of Spec 13A, used as a weighting agent in downhole fluids.

All other reagents, additives or chemicals are commercial grades obtained through retail chemical distributors.

Samples for the tests described in Examples 1 through 7 herein were prepared on a standard Hamilton Beach mixer as is typically used by persons practicing the art. Materials in the proportions set forth in the Examples were added to water in the following order: prehydrated clay, presheared PCC, inorganic salt, drilled solids, deflocculants, filtration control materials, caustic for pH adjustment, and barite in an amount sufficient to achieve the target fluid density. After each addition, the sample was stirred in the mixer for about 5 to 10 minutes or until well mixed. After all materials were added, the sample was then equilibrated by heating for about 16 hours at 150° F. in a roller oven, which oven is well known to practitioners of the art. After equilibration, the sample was stirred in the mixer for 10 to 30 minutes and the pH was readjusted with caustic addition as necessary. The sample was then aged for about 16 hours to 400° F. or 425° F., as set forth in the pertinent Example, in a roller oven. The sample was stirred for 10 to 30 minutes in the mixer and the pH was again readjusted with caustic addition as necessary.

Samples for the tests described in Examples 8 and 9 were actual field samples taken from the flow line exiting the annulus of the wellbore. Other than adjusting pH as necessary to correct it to the field pH, no further procedures were performed upon these samples before laboratory tests were run.

The following test was performed upon samples of the fluids in the Examples to obtain the rheological profiles: Using a Fann 50C Viscometer, a room temperature sample was inserted into the instrument and pressurized to 500 psi with nitrogen. The sample was sheared continuously at a shear rate of 102 sec$^{-1}$, corresponding to an instrument reading of 60 rpm. The temperature of the sample was increased at a rate of 2 F.°/minute from room temperature to 120° F. While the temperature of the sample was maintained at 120° F., measurements of plastic viscosity, yield point and gel strengths were taken in accordance with the procedures set forth in RP 13B-1. The temperature of the sample was then increased from 120° F. to a peak temperature of roughly 400° F. or roughly 425° F., as further set forth in the Examples, at 2 F.°/minute. At this peak temperature, plastic viscosity, yield point and gel strengths were measured in accordance with RP 13B-1, while the temperature of the sample was maintained at the peak temperature. The sample was then held at the peak temperature for 30 minutes with continuous shear applied at 102 sec$^{-1}$. Finally, the sample was cooled from the peak temperature to 120° F. at 6 F.°/minute. At 120° F., the plastic viscosity, yield point and gel strengths were again determined in accordance with RP 13B-1 while the temperature of the sample was maintained at 120° F. While the sample was in the process of being heated or cooled, readings of shear stress as a function of temperature were taken at one minute intervals. Shear stress is converted to effective viscosity at 102 sec$^{-1}$ by multiplying the output by 5.0. The heating curve was graphed as a series of closely spaced dots representing the data points; the cooling curve was graphed as a solid line connecting the data points collected during the cooling phase. These curves are the curves depicted throughout the FIGURES herein for each of the fluids tested.

Each of the remaining tests which were performed upon the samples of the drilling fluids discussed in the Examples were standard tests for drilling fluids, which tests are set forth in RP 13B-1.

EXAMPLE 1

Figure 1B:
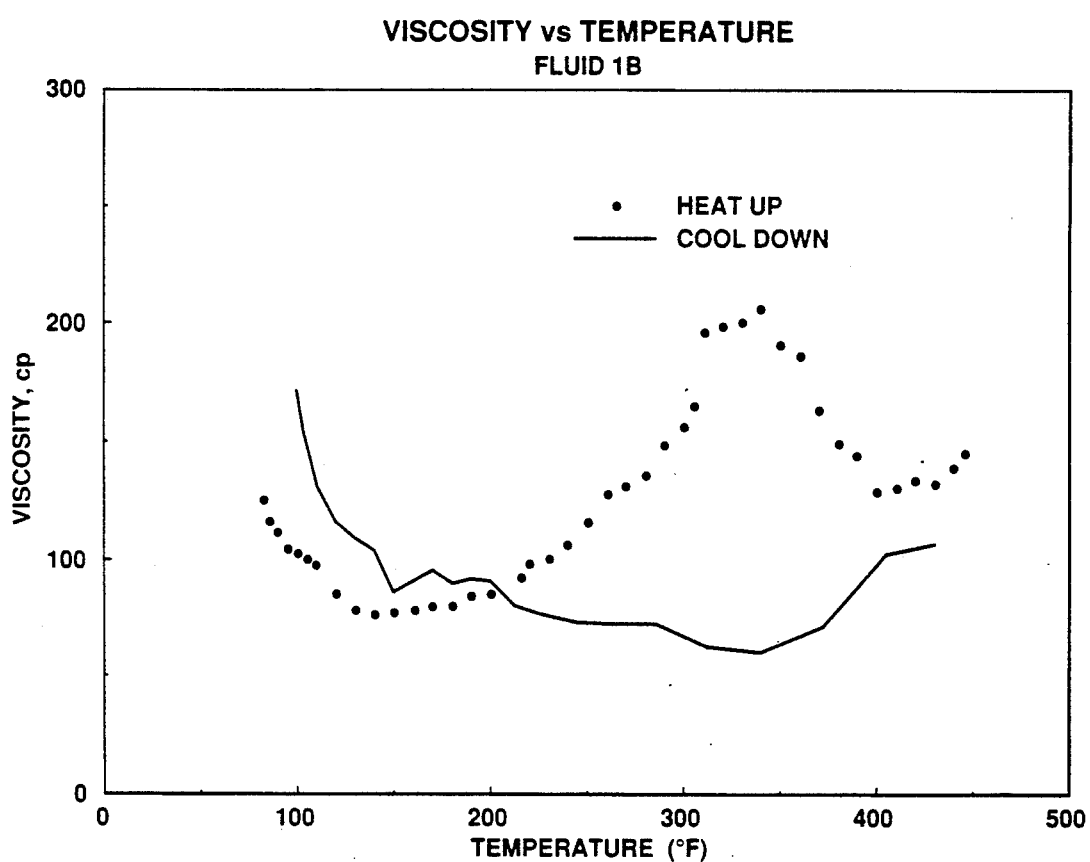

Two water-based fluid samples, Fluids 1A and 1B, were prepared; their compositions and properties are provided in Table 1. They were identical in composition except for chloride concentrations. After aging at 425° F. for 16 hours, each sample was then tested on a Fann 50C Viscometer as detailed above to a peak temperature of 450° F. The effective viscosities of Fluids 1A and 1B as a function of temperature were then plotted in FIGS. 1A and 1B, respectively. Comparison of these two FIGURES demonstrates that rheological stability throughout this temperature range requires the presence of inorganic salt in addition to the clay and the PCC, even where said clay and said PCC are present in proportions sufficient to produce a mud within the yield point, gel strengths, and HTHP filtration measurement requirements disclosed above.

EXAMPLE 2

Figure 2A:
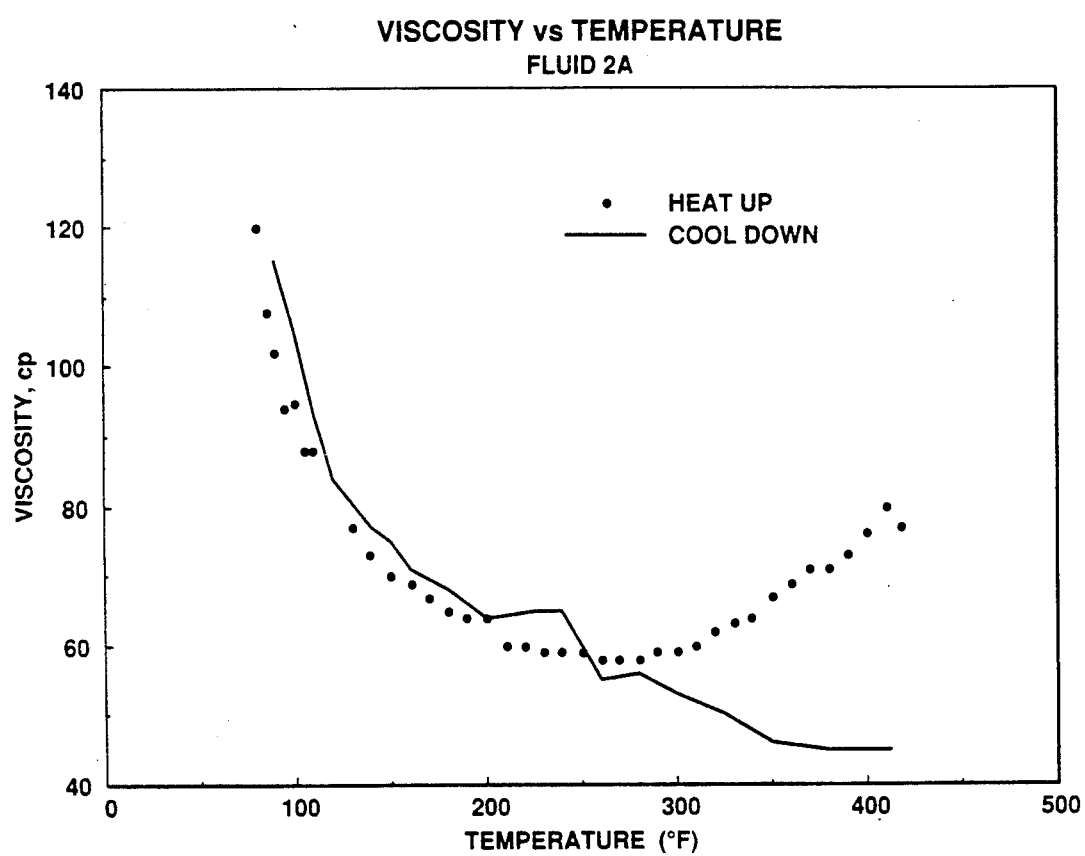
FIGS. 2A, 2B and 2C are graphs used to compare the viscosities over a broad temperature range of three muds, again identical except for chloride concentrations, as discussed in Example 2. This comparison demonstrates the need for inorganic salt in the mud to stabilize the rheology of the mud.
Figure 2B:
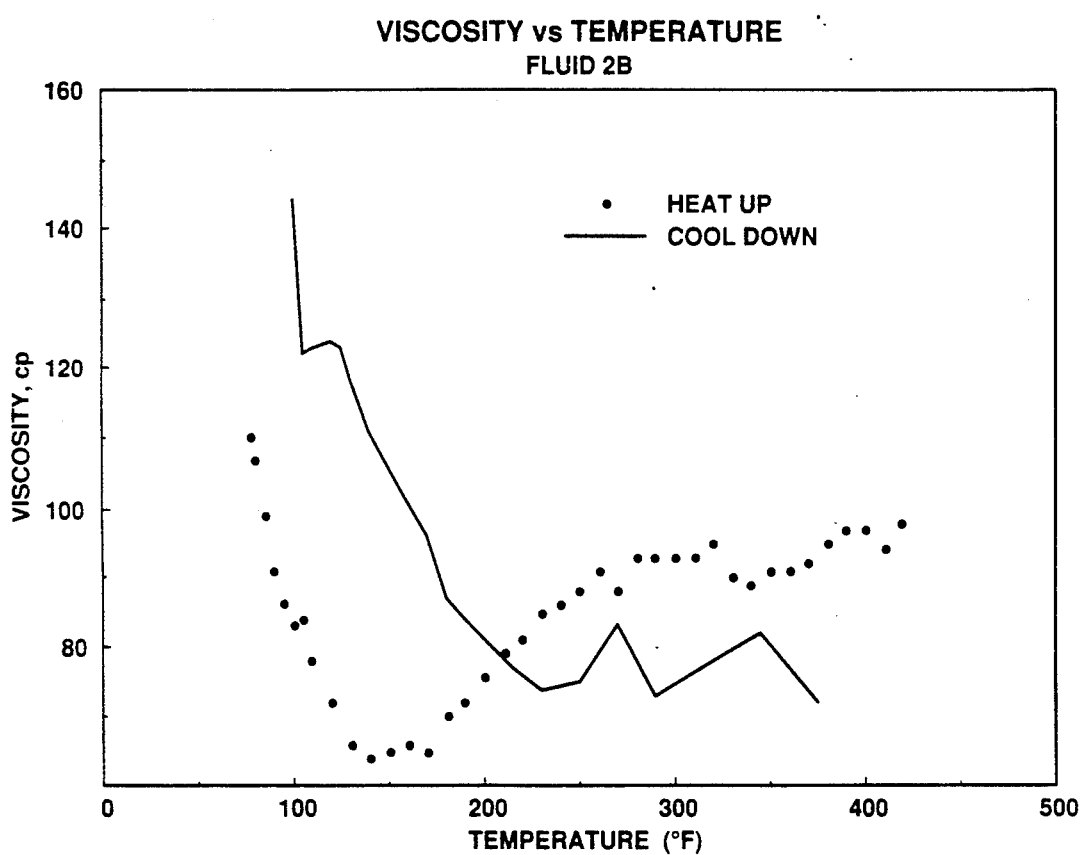
Figure 2C:
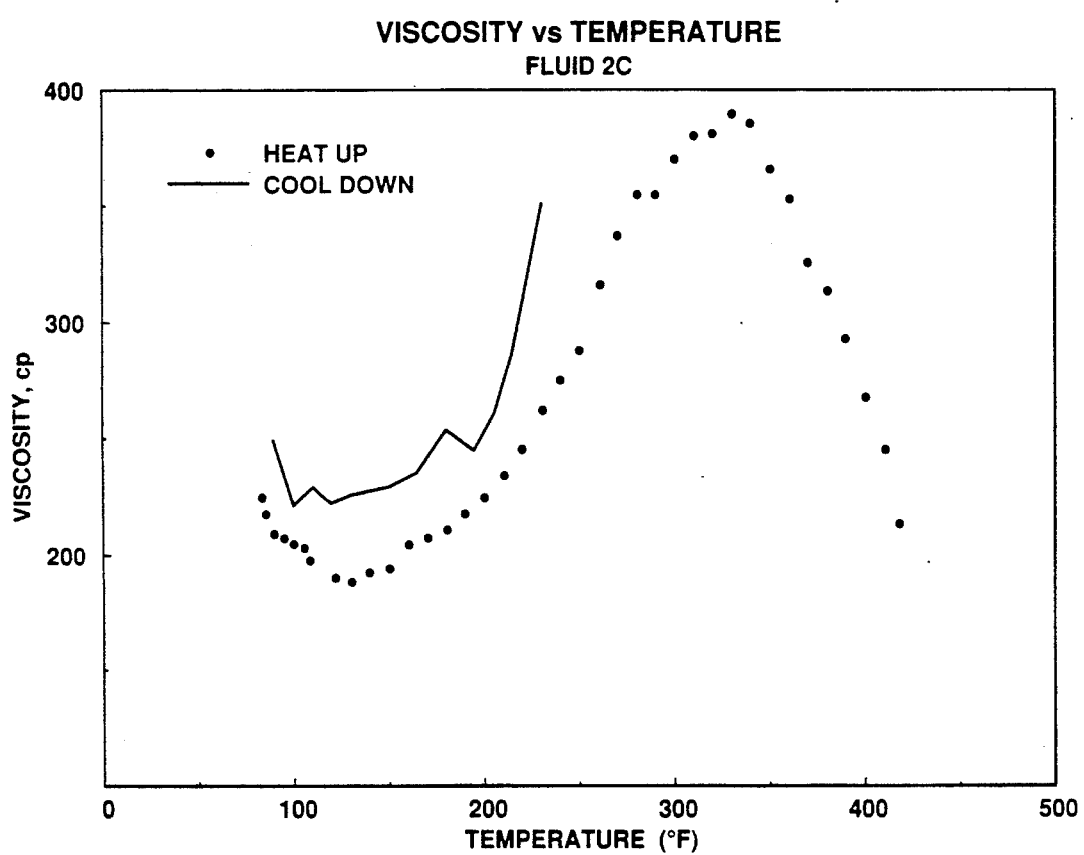
Figure 3A:
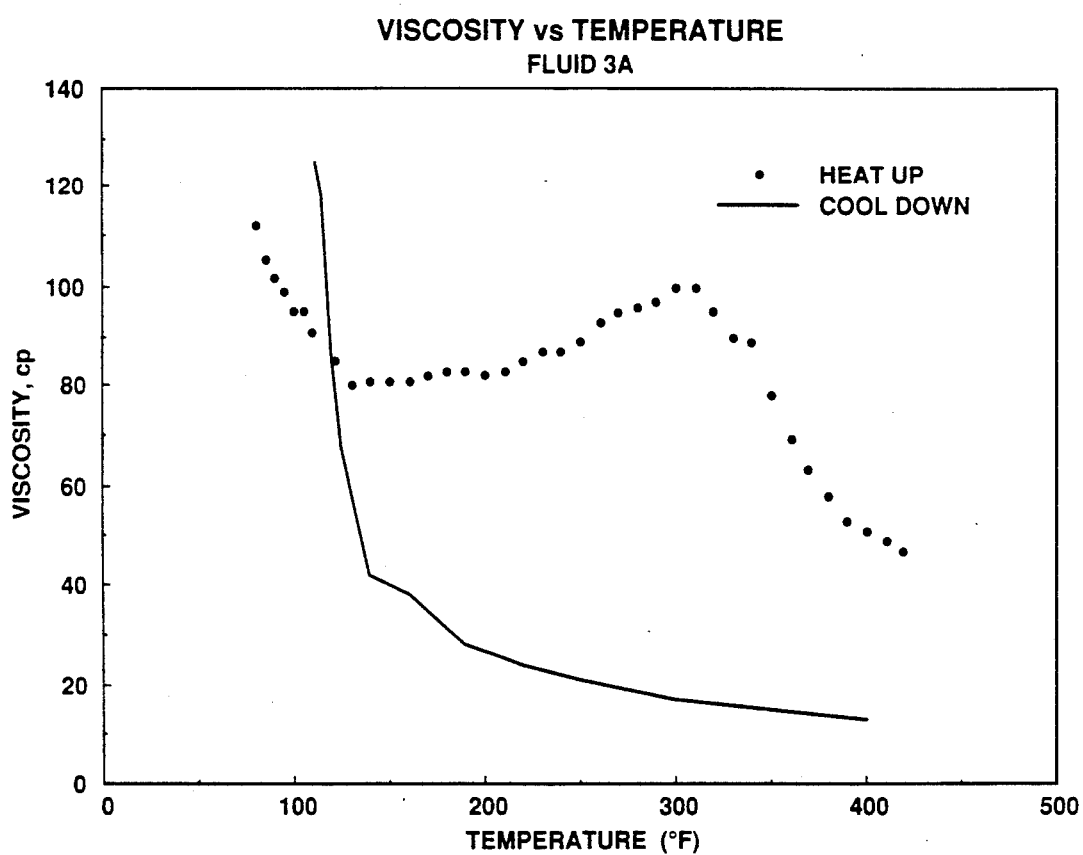
FIGS. 3A, 3B, 3C, 3D, and 3E are graphs used to compare the viscosities over a broad temperature range of five muds, again identical except for chloride concentrations, as discussed in Example 3. This comparison establishes that there is an upper limit on chloride concentration for this invention, beyond which the rheology becomes unstable.
Figure 3B:
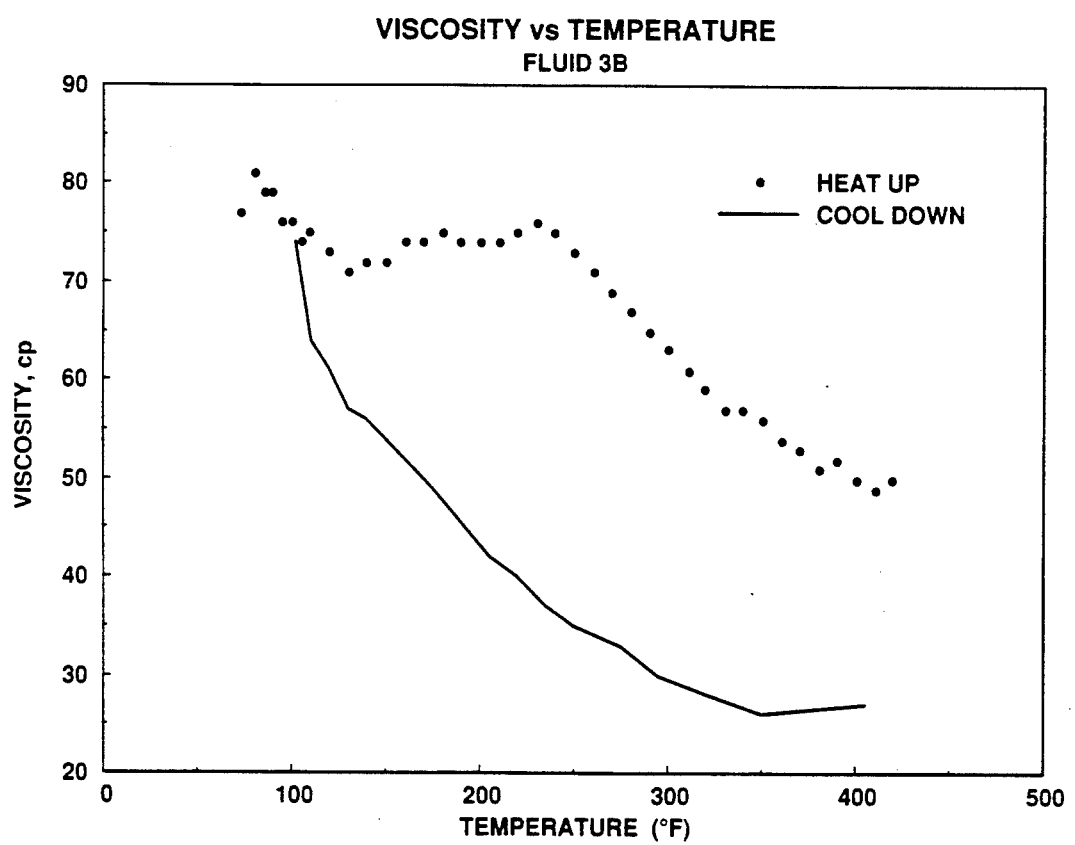
Figure 3C:
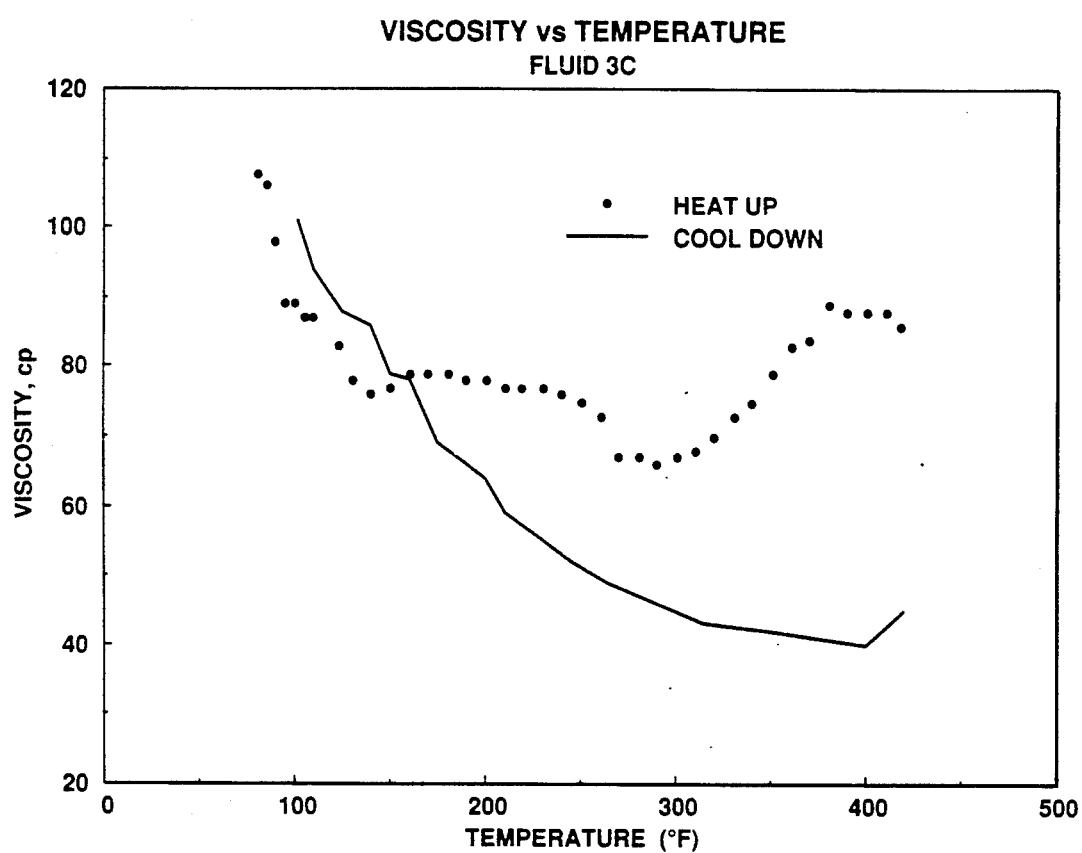
Figure 3D:
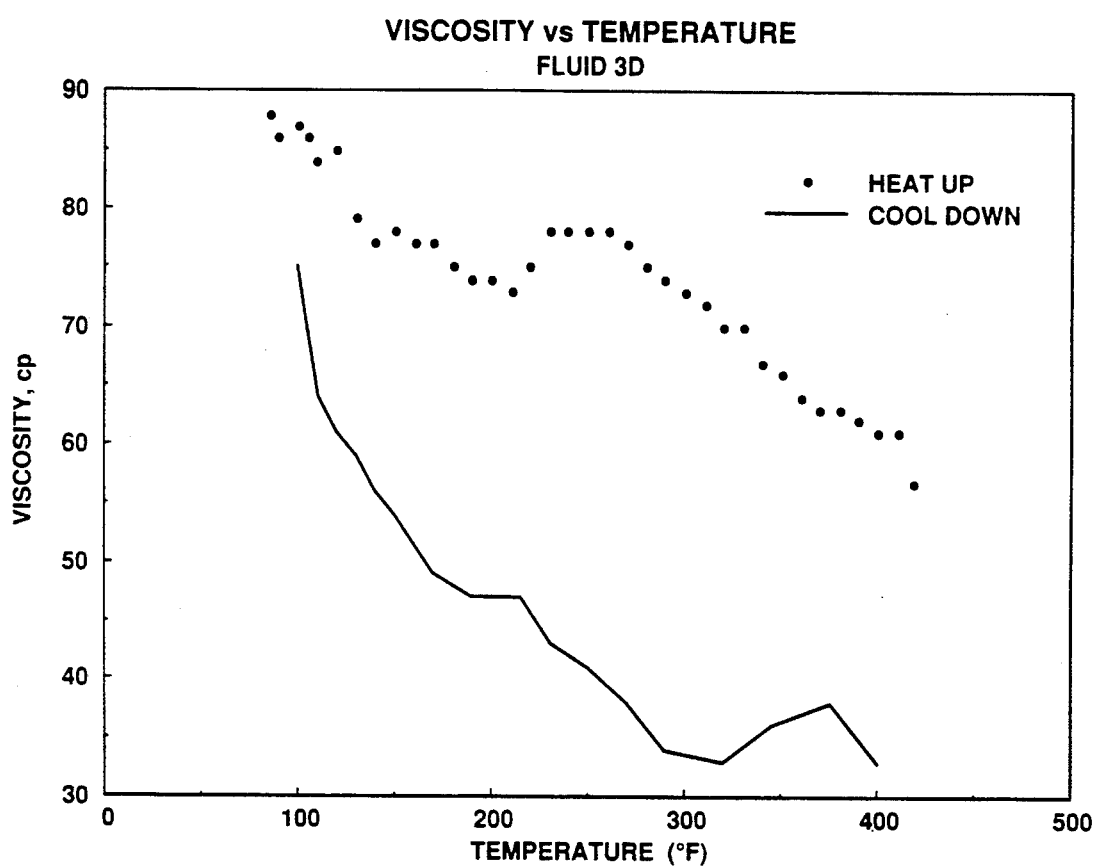
Figure 3E:
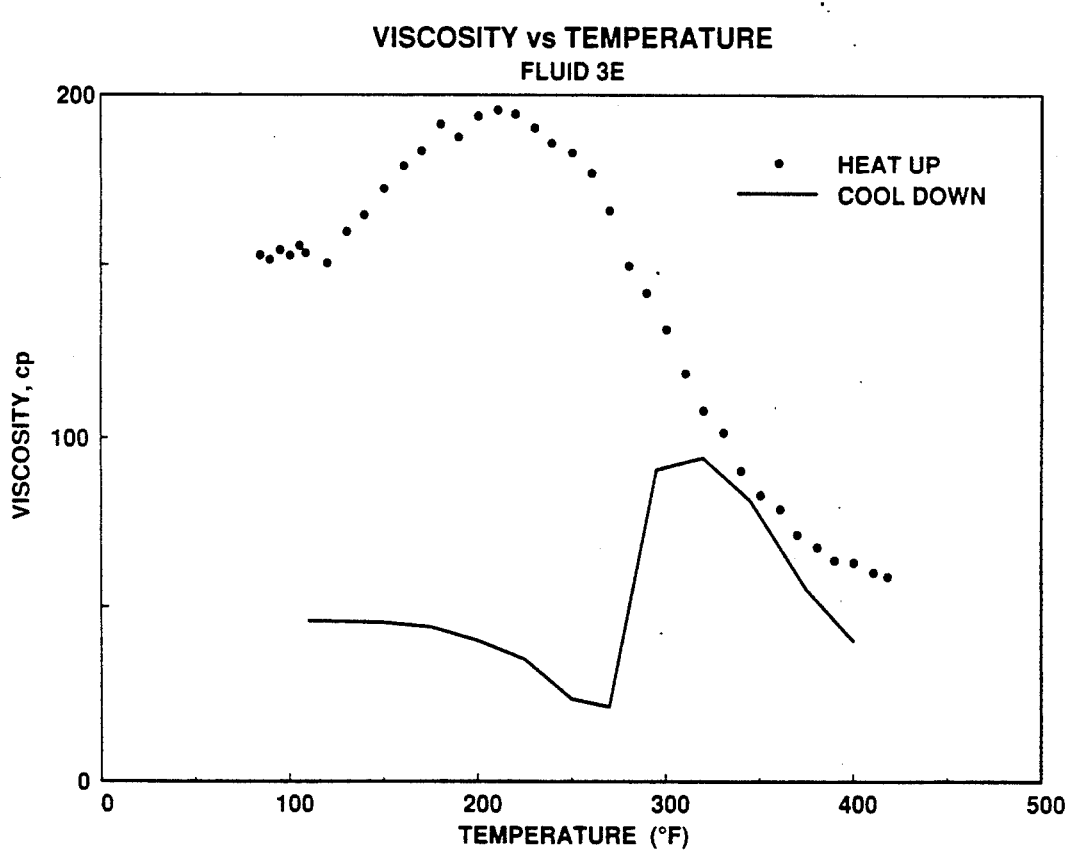

Three water-based fluid samples, 2A, 2B, and 2C, were prepared; their compositions are set forth in Table 2. They were identical except for chloride concentrations. After aging the samples at 400° F. for 16 hours, the Fann 50C Viscometer test was run on each fluid, with a peak temperature of 425° F. rather than 450° F. Results for Fluids 2A, 2B, and 2C are shown in FIGS. 2A, 2B, and 2C, respectively. Comparison of these three FIGURES shows the dramatic stabilizing effect chloride addition has upon the drilling fluid of this invention, all other aspects remaining the same.

EXAMPLE 3

Five water-based fluid samples, Fluids 3A, 3B, 3C, 3D and 3E, were prepared, with compositions as shown in Table 3. These fluids were identical except for an increasing concentration of chlorides. After the samples were aged for 16 hours at 400° F., the Fann 50C Viscometer test was performed to about 425° F. Results for Fluids 3A, 3B, 3C, 3D and 3E are shown in FIGS. 3A, 3B, 3C, 3D and 3E, respectively. These FIGURES confirm that the fluids become more stable with anionic salt species concentrations above about 4,000 ppm and that this stabilizing effect disappears for this particular prehydrated clay/presheared PCC blend at chloride concentrations of about 58,500 ppm.

EXAMPLE 4

Figure 4A:
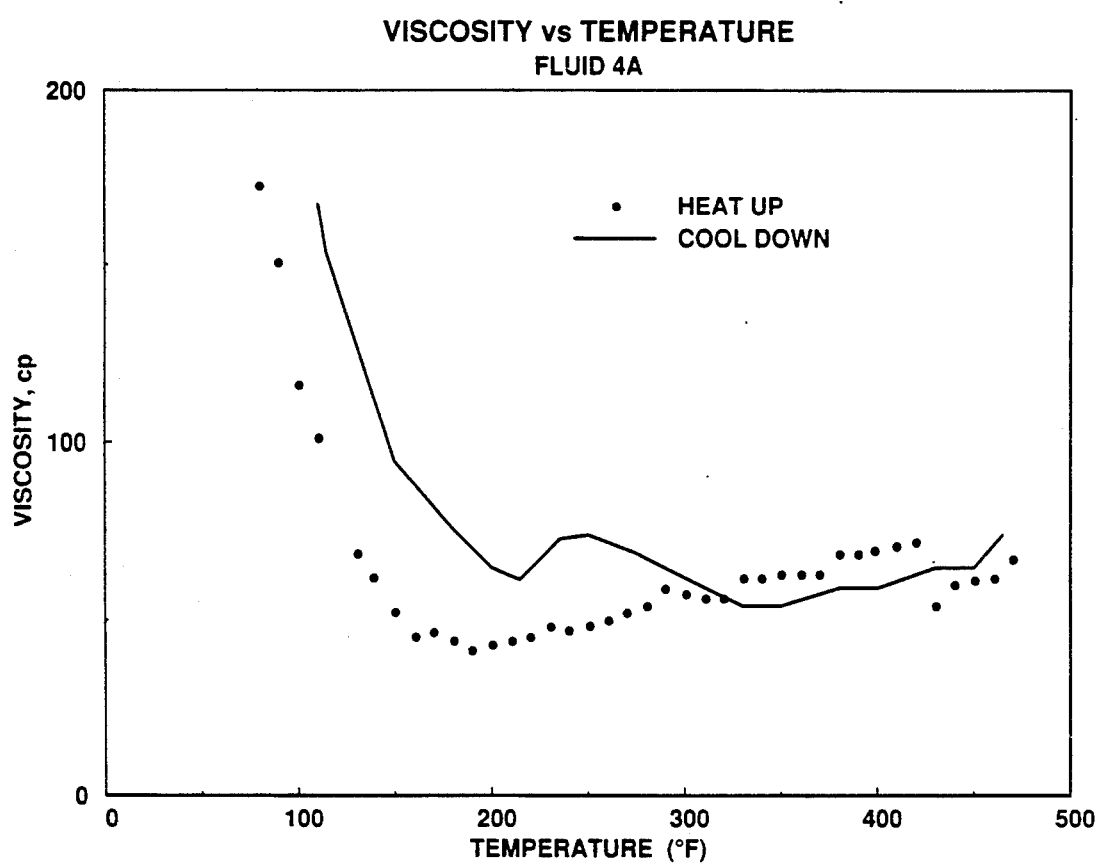
FIGS. 4A, 4B, 4C, 4D, 4E and 4F are graphs used to compare the viscosities over a broad temperature range of six muds, in which muds the clay and PCC proportions were manipulated while chloride and density were kept constant, as discussed in Example 4. Comparisons of these graphs were used in determining appropriate manipulations of proportions of clay and PCC for testing purposes.
Figure 4B:
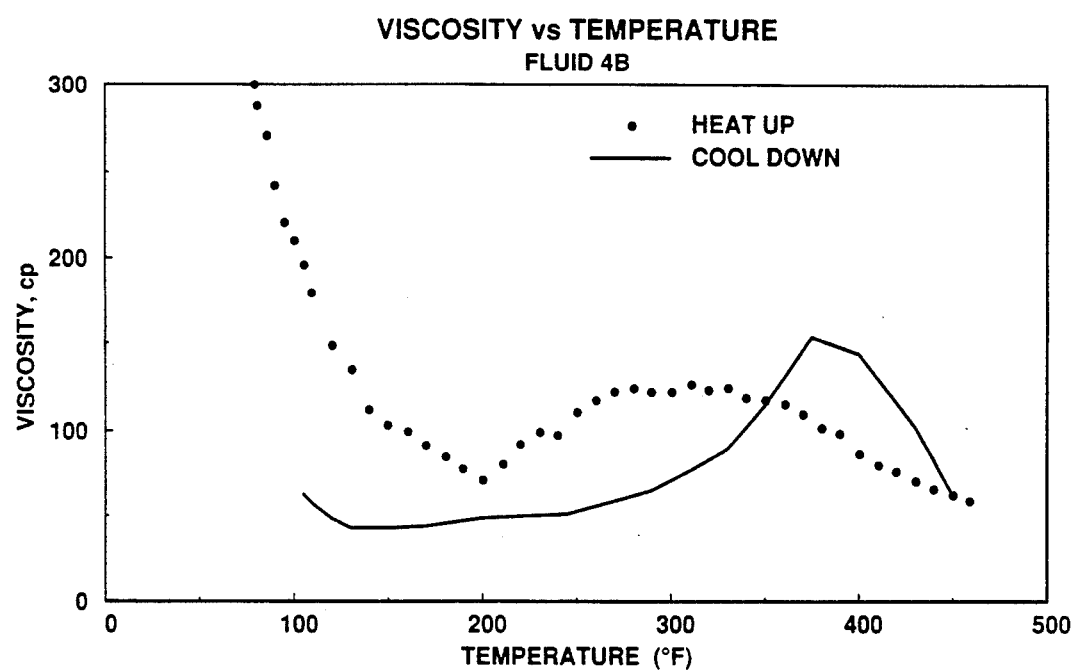
Figure 4C:
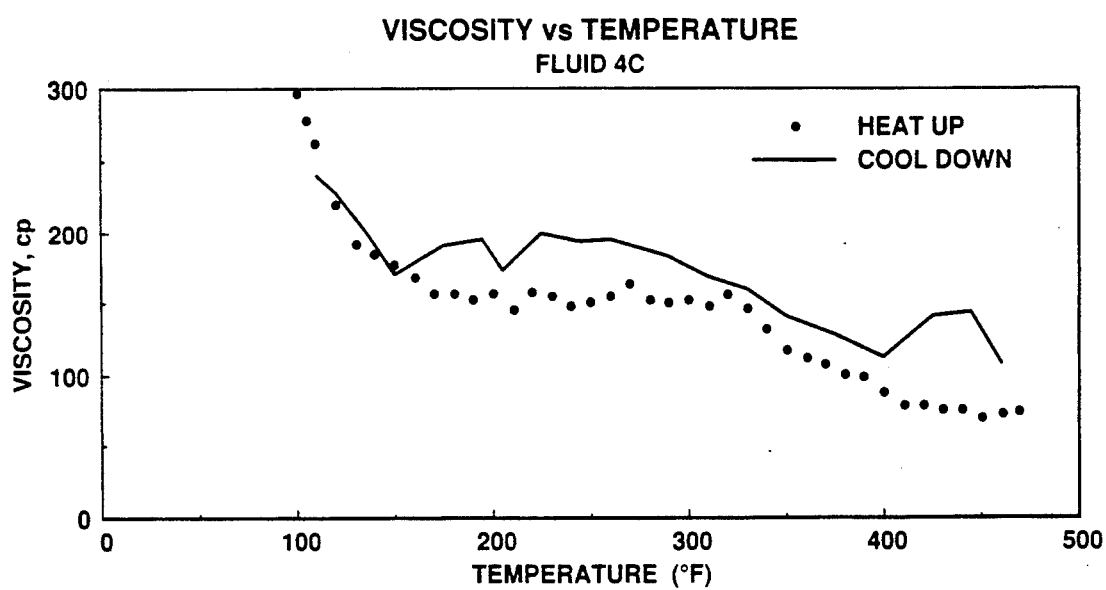
Figure 4D:
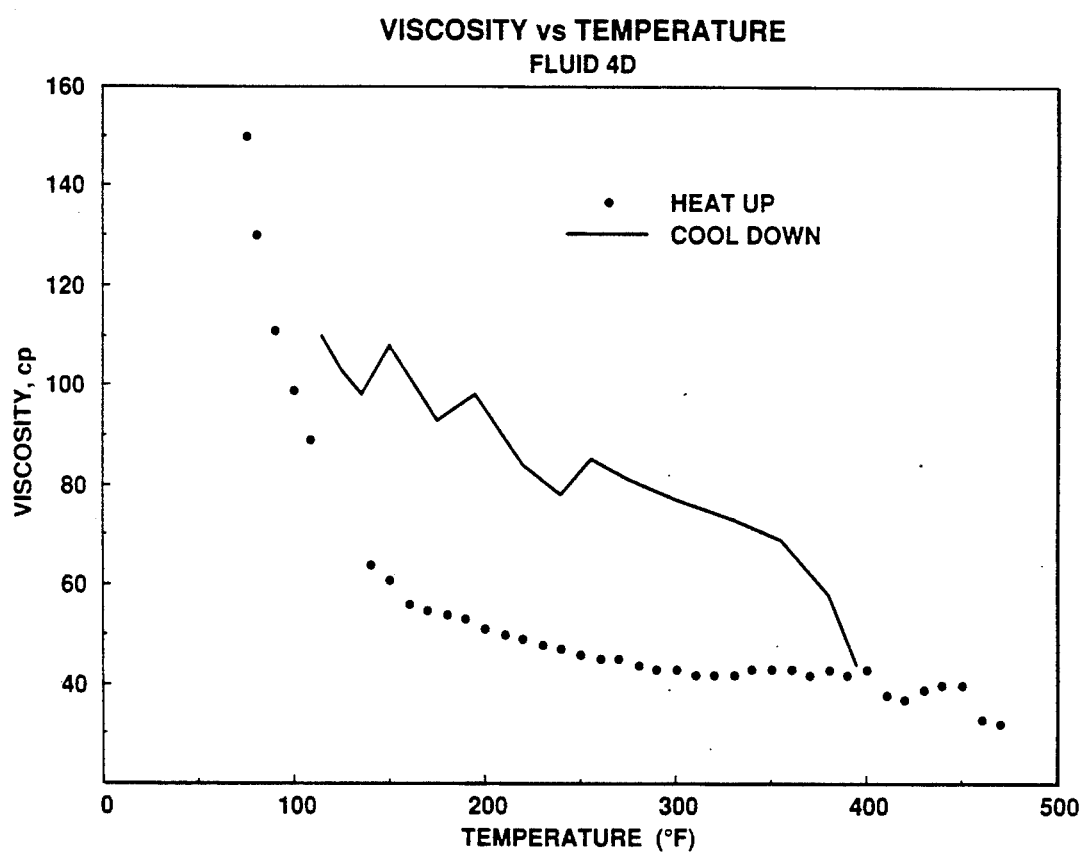
Figure 4E:
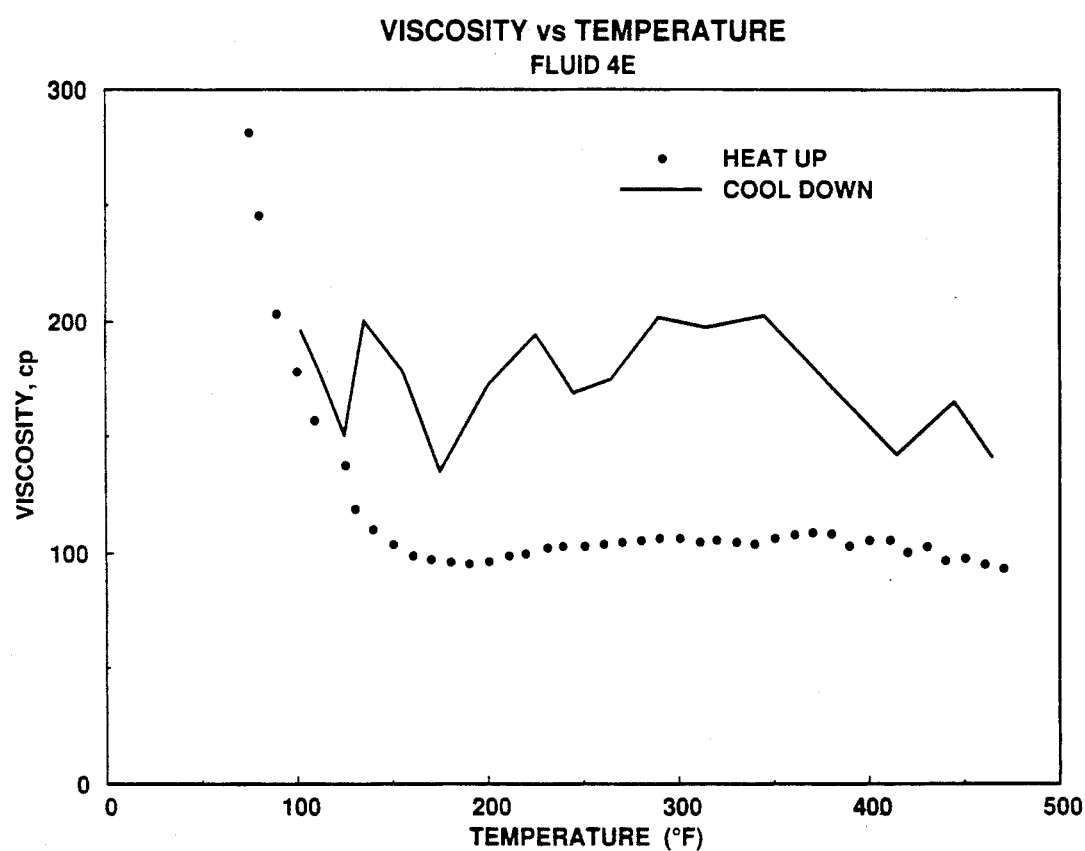
Figure 4F:
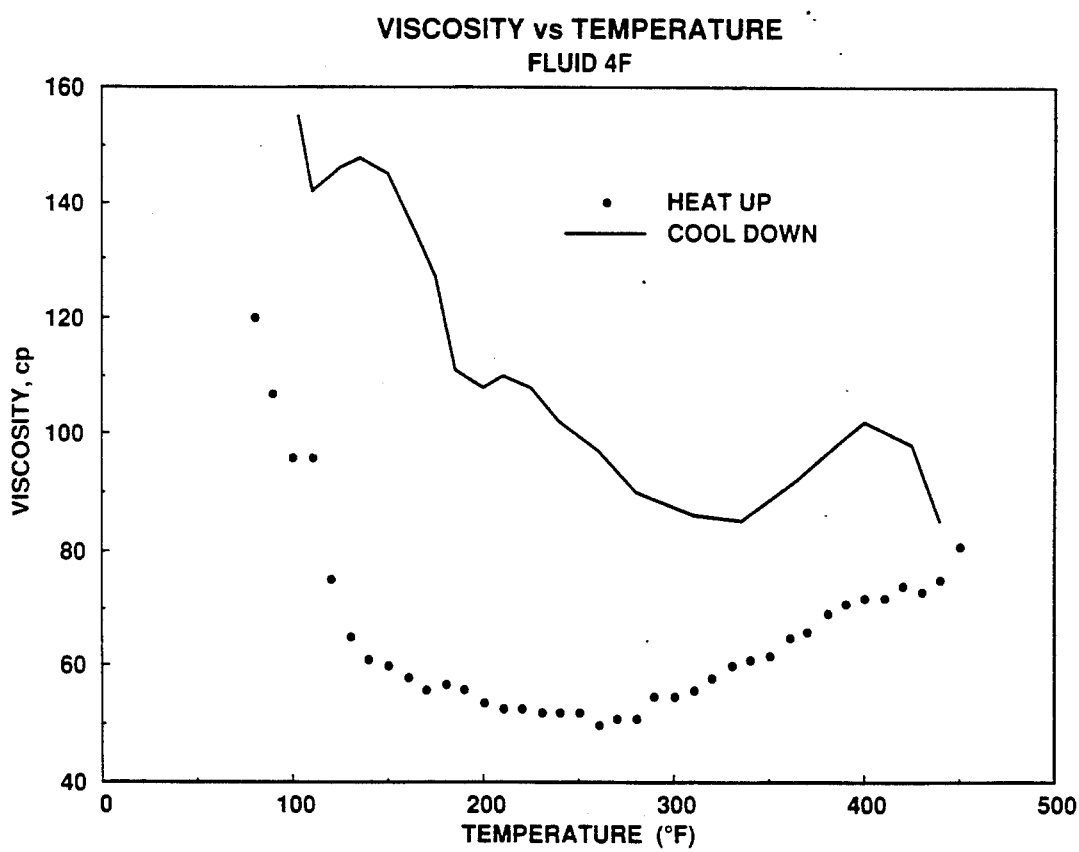

Six water-based fluid samples, Fluids 4A, 4B, 4C, 4D, 4E and 4F, were prepared, with compositions as given in Table 4. After aging the samples to 425° F. for 16 hours, the Fann 50C Viscometer test was run on each fluid, with a peak temperature of 475° F. The results for Fluids 4A, 4B, 4C, 4D, 4E and 4F are depicted in FIGS. 4A, 4B, 4C, 4D, 4E and 4F, respectively. Comparison of FIGS. 4A and 4B indicates that when a realistic amount of drilled solids, such as 6.5 vol. %, as in Fluid 4B, is used, 12 lb/bbl prehydrated clay is too high a concentration in the fluid for the fluid to be able to maintain a stable rheological profile. Modification of the fluid to reduce prehydrated clay and to add some presheared PCC, yielded a mud, Fluid 4C, that was undesirably viscous within the relevant temperature range, as shown in FIG. 4C. The prehydrated clay concentration was further reduced, from 8 lb/bbl to 4 lb/bbl, in Fluid 4D, while the presheared PCC concentration stayed constant. This gave a ratio of 2:1 clay to PCC. The rheological properties of the resulting fluid, as shown in FIG. 4D, were at the lowest acceptable effective viscosity for good operational results. As a check on whether the prehydrated clay or the presheared PCC was the prime contributor to the high viscosity of Fluid 4C, Fluid 4E matched Fluid 4C except for a halving of the presheared PCC from 2 lb/bbl to 1 lb/bbl. The resulting data from the Fann 50C Viscometer test are shown in FIG. 4E. This fluid was at the upper limit of acceptable viscosity during the heating cycle and displayed some instability during the cooling cycle. Fluid 4F returned to the 4:1 prehydrated-clay-to-presheared-PCC ratio of Fluid 4C, but reduced the clay and the PCC concentrations to 6 and 1.5 lb/bbl, respectively. Test results, shown in FIG. 4F, demonstrate that this sample was stable, remaining within the desired viscosity range for temperatures of 150° F. to 450° F.

EXAMPLE 5

Figure 5:
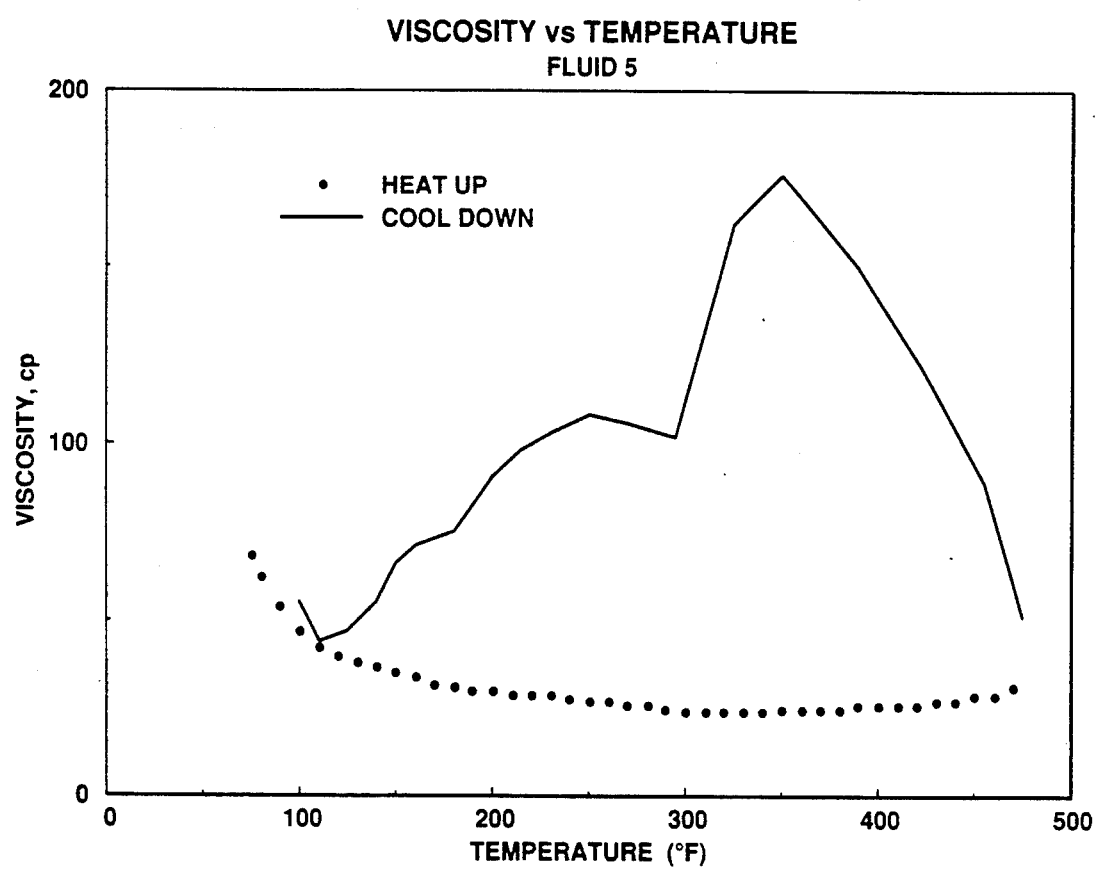
FIG. 5 is a graph depicting the effective viscosity over a broad temperature range of a mud with PCC and chloride within the recommended range, but with no clay, as discussed in Example 5. This FIG. 5 demonstrates the need for clay to be present in the fluid of this invention.

A sample with no clay, 5 lb/bbl presheared PCC, 6½ vol. % drilled solids, 2 lb/bbl Desco CF, 1 lb/bbl Miltemp 20 lb/bbl Filtrex, 2 lb/bbl KemSeal, and 16,000 ppm chloride (from Sea Salt) was prepared. The fluid density was 12.5 lb/gal. After the sample was aged at 425° F. for 16 hours, the Fann 50C Viscometer test was run to a peak temperature of 475° F.; results are depicted in FIG. 5. The pH was 10.4; the yield point was 6 lb/100ft$^2$; the 10-second, 10-minute and 30-minute gel and the strengths were 5, 17, and 20 lb/100ft², respectively, and the HTHP filtration was 94 cc/30 min. This blend was rejected because of the extremely low viscosity of the fluid after partial thermal decomposition of the presheared PCC, and also because of the high HTHP filtration rate. These results confirm that clay is essential for stability of the mud of this invention.

EXAMPLE 6

Figure 6A:
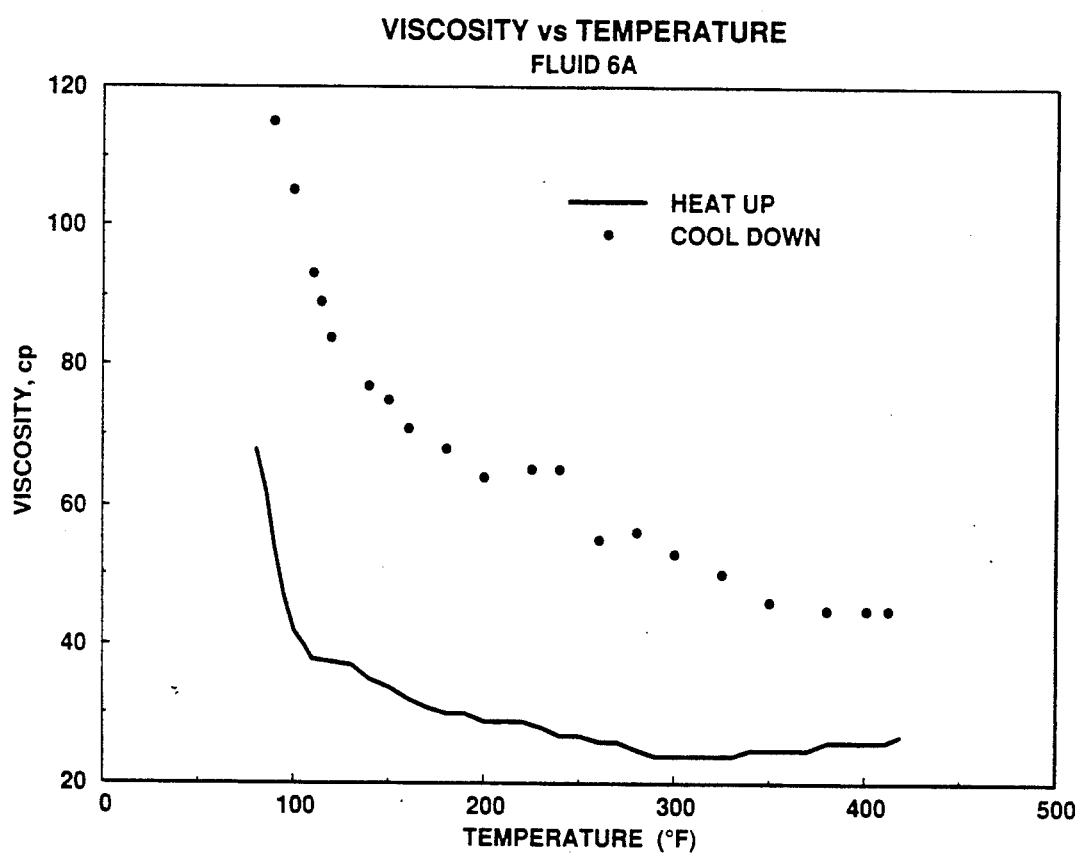
FIGS. 6A, 6B and 6C are graphs used to compare the viscosities over a broad temperature range of three muds, in which the clay and PCC proportions were again manipulated, as described in Example 6. Comparison of these graphs demonstrates the need for PCC to be present in the fluid of this invention.
Figure 6B:
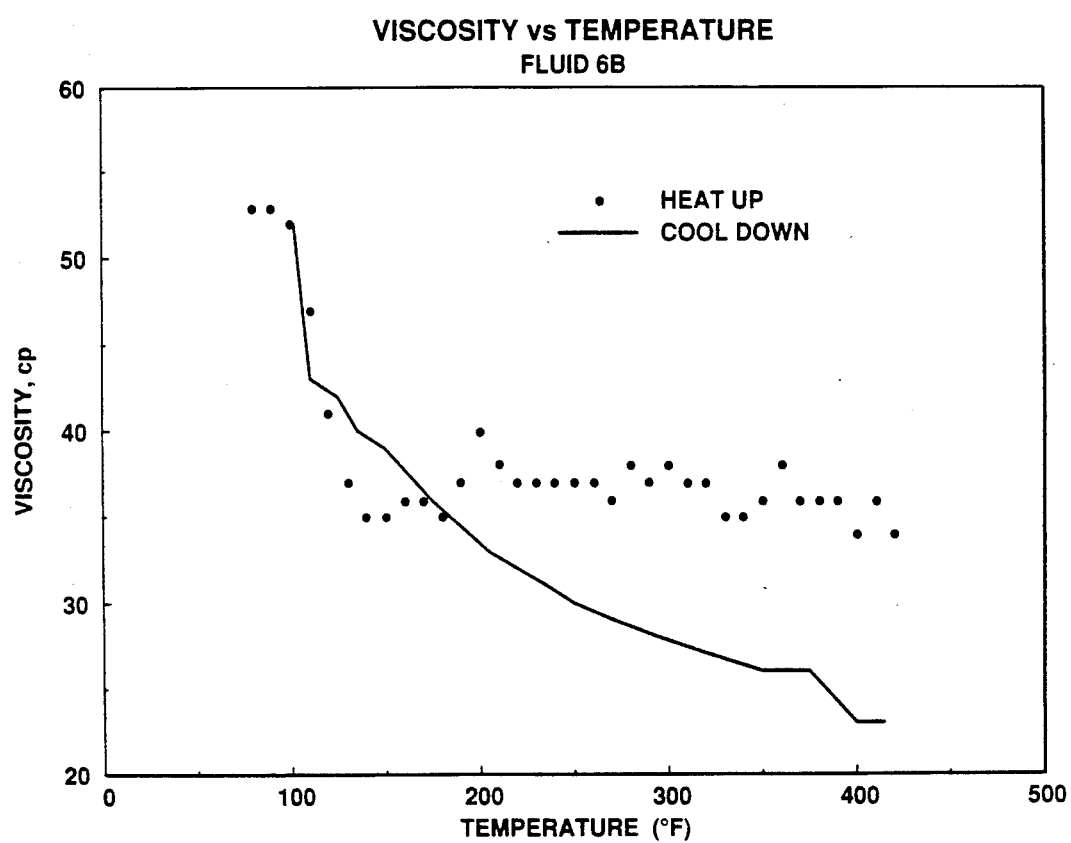
Figure 6C:
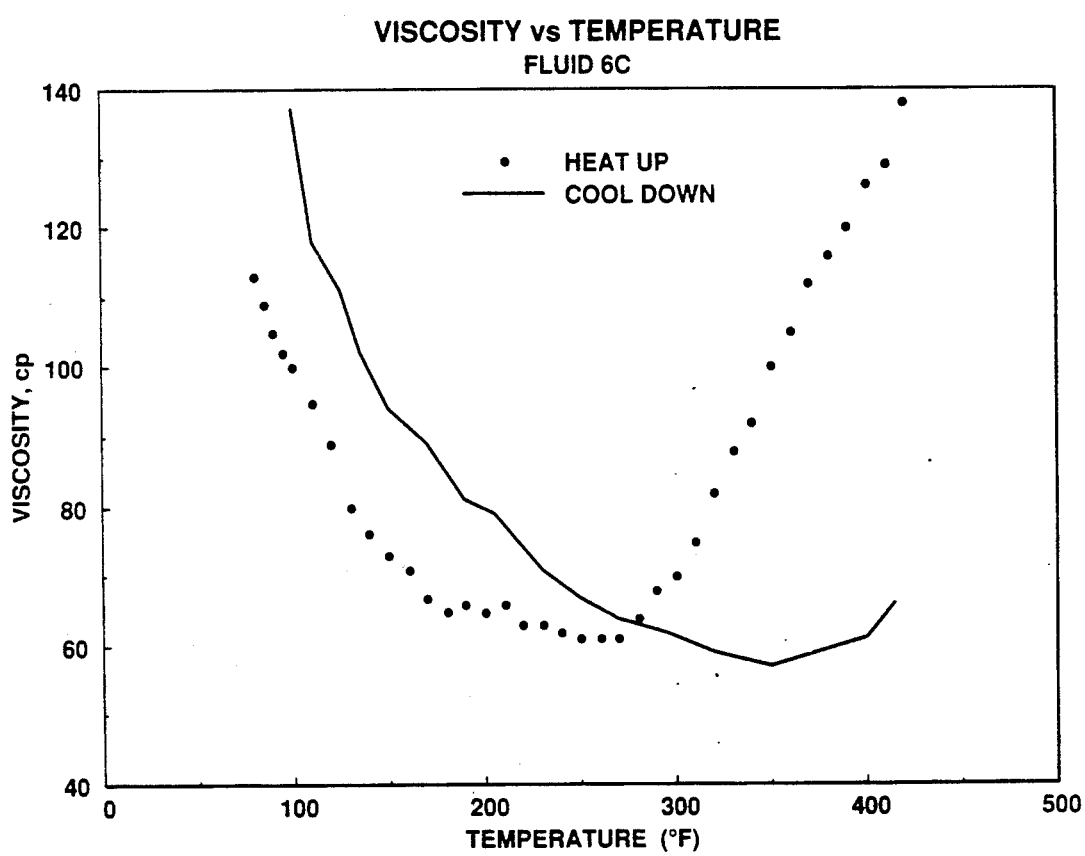
Figure 7A:
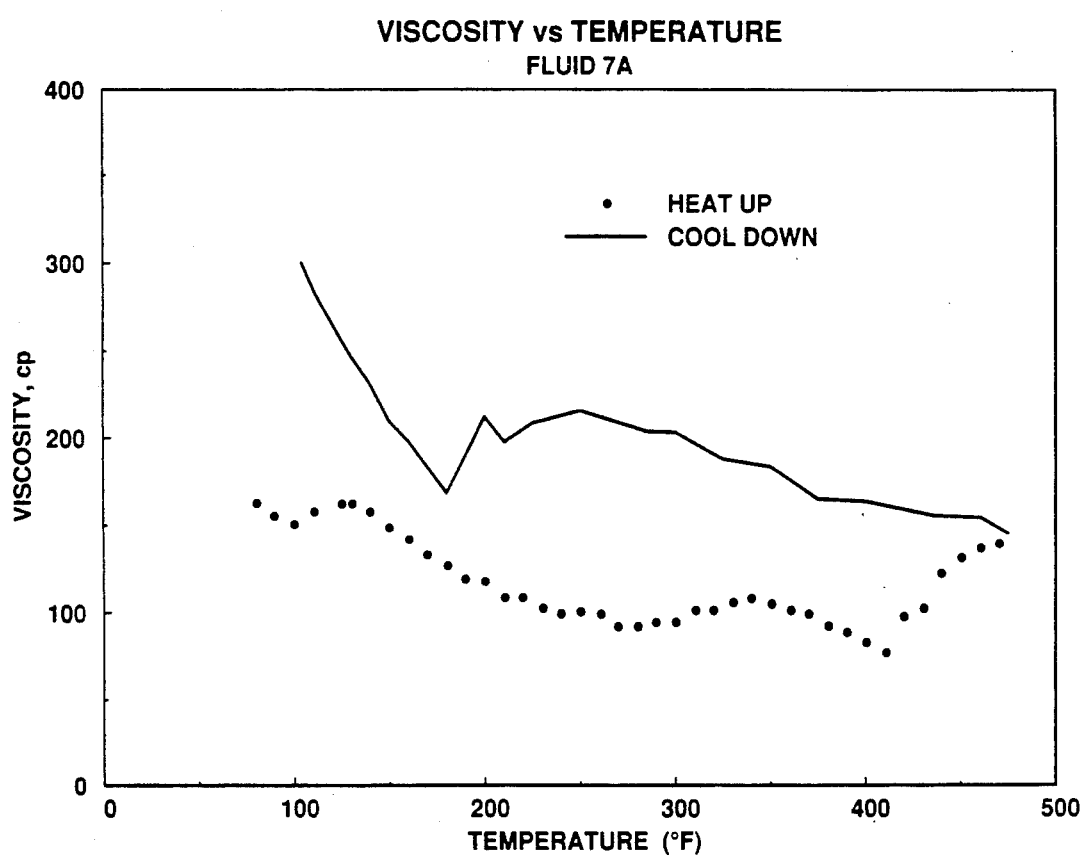
FIGS. 7A, 7B, 7C, 7D and 7E are graphs used to compare the viscosity over a broad temperature range of four high quality muds representative of the prior art to the viscosity of the mud of this invention. The various plots indicate the viscosities as the type and concentration of components were varied as discussed in Example 7.
Figure 7B:
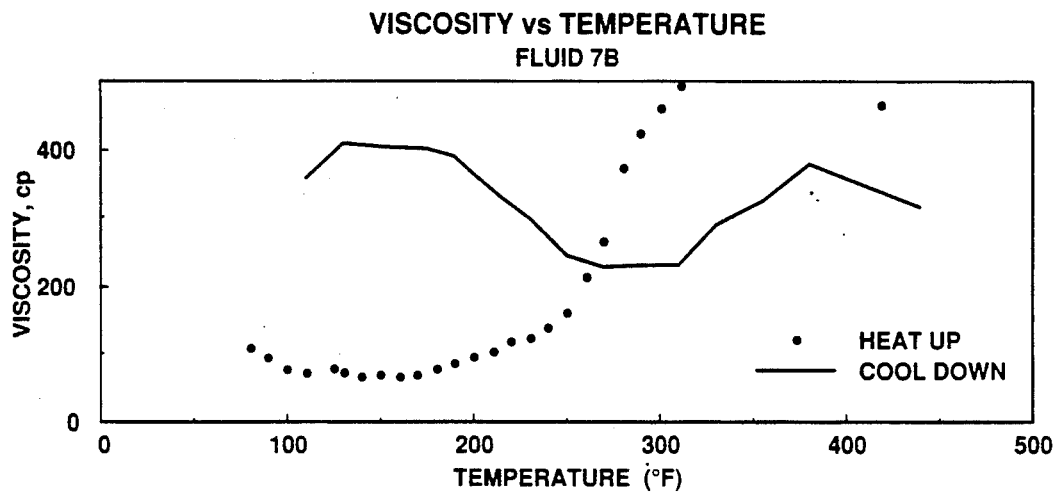
Figure 7C:
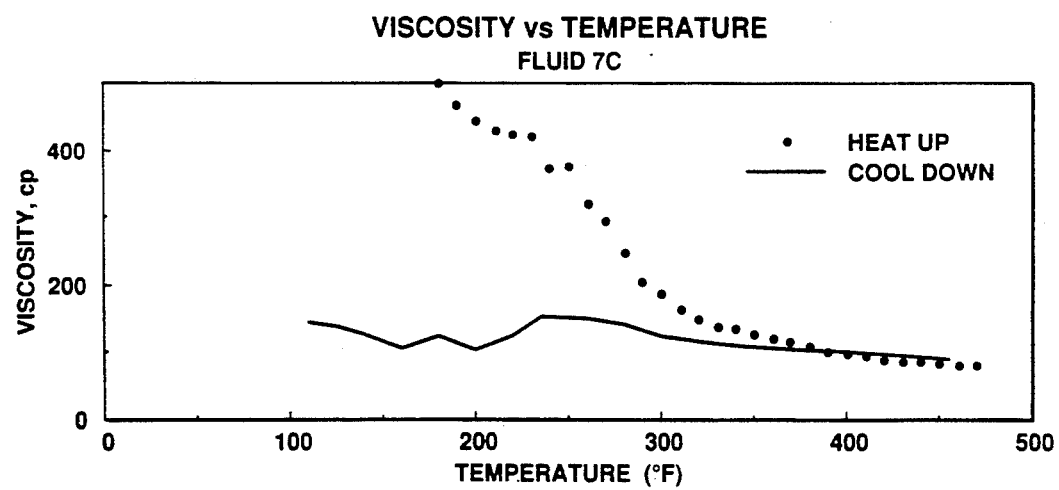
Figure 7D:
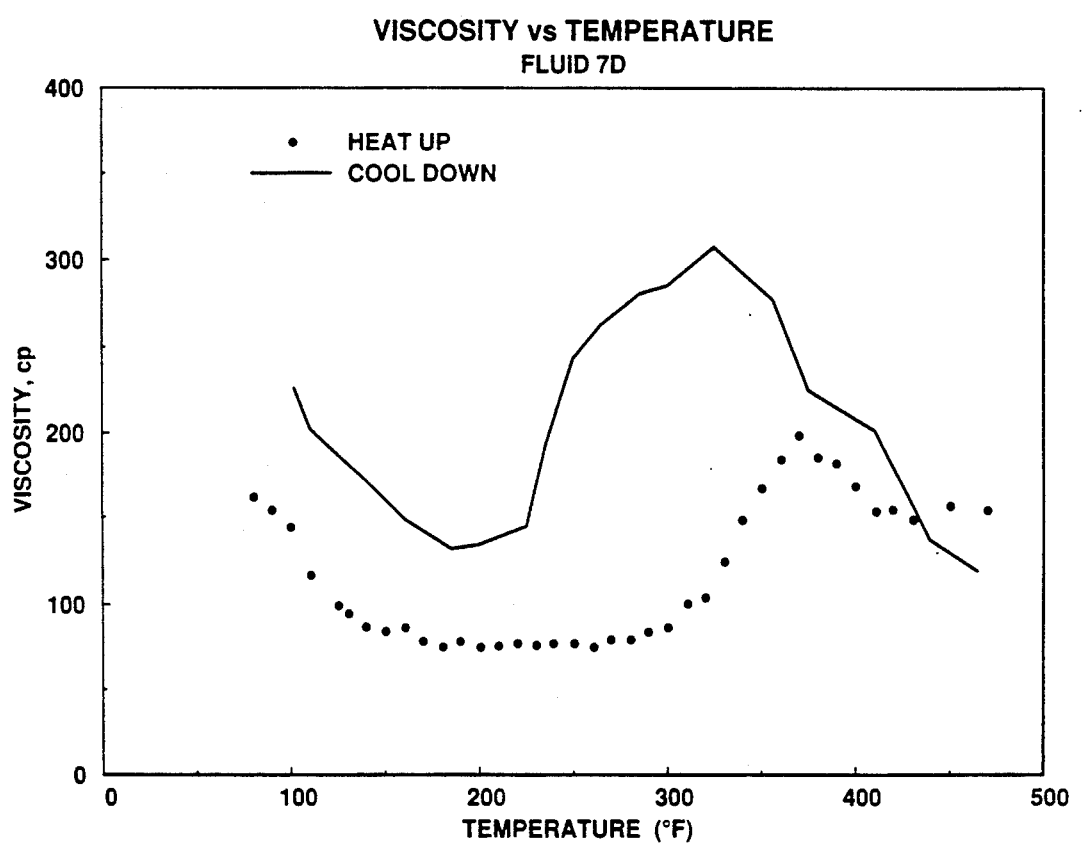
Figure 7E:
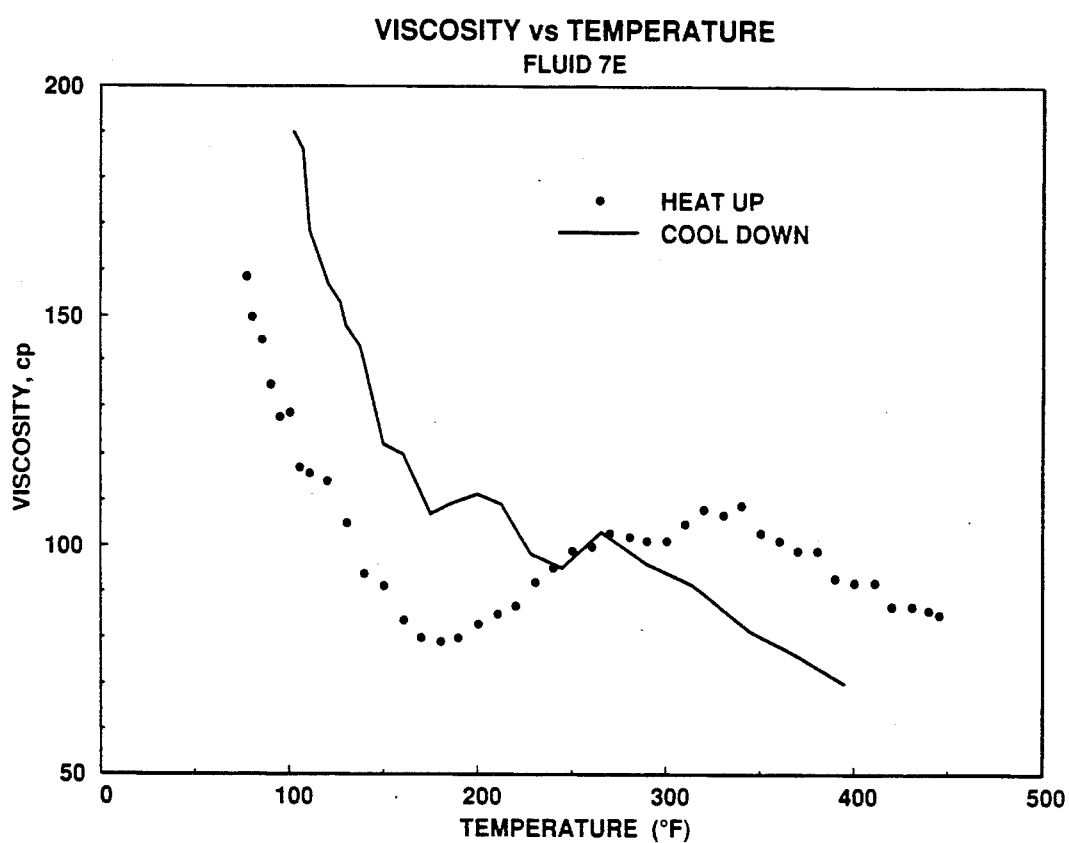

Three water-based fluid samples, Fluids 6A, 6B and 6C, with compositions as given in Table 5, were prepared. After aging at 400° F. for 16 hours, the Fann 50C Viscometer tests was run to a peak temperature of 425° F. The resulting data for Fluids 6A, 6B and 6C are recorded in FIGS. 6A, 6B and 6C, respectively. This series involved further manipulation of the clay and PCC concentrations to clarify the effect of such concentrations on the rheology of the fluids. These fluids had a lower density (11 lb/gal) than that of the Example 4 fluids, which latter density was 13 lb/gal. This lower density resulted in a fluid which was tolerant of a higher clay concentration than were the Example 4 fluids. The apparent maximum clay concentration at this density was between 8 and 10 lb/bbl. The Fann 50C Viscometer test showed some thickening at high temperatures (above 350° F.) for Fluid 6C. In addition, the essential viscosifying effect of the addition of PCC is apparent from comparison of FIGS. 6A and 6B. The fluid with no PCC, shown in FIG. 6B, was too thin to be able to carry drilled particles efficiently. When 2 lb/bbl of PCC was added to this sample, as in Fluid 6A, viscosity remained within the desired range for temperatures of 100° F. through 400° F.

EXAMPLE 7

In an attempt to compare the mud of this invention with typical muds of the prior art, five water-based fluid samples, Fluids 7A, 7B, 7C, 7D and 7E, were prepared with compositions as set forth in Table 6. After aging the samples to 425° F. for 16 hours, the Fann 50C Viscometer test was run with a peak temperature of 475° F. Results for Fluids 7A, 7B, 7C, 7D and 7E are shown in FIGS. 7A, 7B, 7C, 7D and 7E, respectively. Fluid 7E was prepared using the methods for preparing the mud of this invention. Fluid 7A exhibited small rheological instabilities beginning at about 300° F. Furthermore, the yield point, gel strengths and HTHP filtration rate of Fluid 7A were all too high for efficient circulation. Fluid 7B exhibited an extremely large viscosity increase beginning at 250° F., resulting in a viscosity as high as about 900 cp. at about 400° F. Gel strengths were also high. Fluid 7C was extremely thick beginning at room temperature, where it exhibited a viscosity of about 900 cp. at ambient temperature. Furthermore, yield point and gel strengths were the highest of any sample in this Example. Fluid 7D had good rheological stability until 370° F. where it, like Fluid 7A, exhibited rheological instability. It also had unacceptably high gel strengths. Fluid 7E was rheologically stable, with yield point, gel strengths, and HTHP filtration all within the ranges which have been determined to be best for optimum drilling performance.

EXAMPLE 8

The first field use of this invention was at a gas well drilling site in Mobile Bay, Alabama. The target formation, or "payzone," was a Jurassic Norphlet Sandstone. The well depth was more than 20,000 feet below sea level. Temperature and pressure conditions at the depth at which the invention was used were 390° F. to 420° F. and 10,500 psi to 14,000 psi respectively. The formation hydrocarbon was composed of sour dry gas with measurable carbon dioxide concentrations. Salinity of the formation brine was high, ranging from 225,000 to 400,000 mg/L total dissolved solids.

Accordingly, critical factors taken into account when customizing the blend to be used as a drilling fluid in the deeper, hotter sections of the well were: the elevated temperature; the high salinity and potential hard brine influx; the presence of carbon dioxide, which causes carbonate-induced gellation in typical clay-based drilling fluids; high pressure; and environmental concerns. These environmental concerns arose from the fact that the well was proximate to various resort developments, recreational waterways, shipping channels and fairways, and a population of about 500,000 in the surrounding area.

Figure 8A:
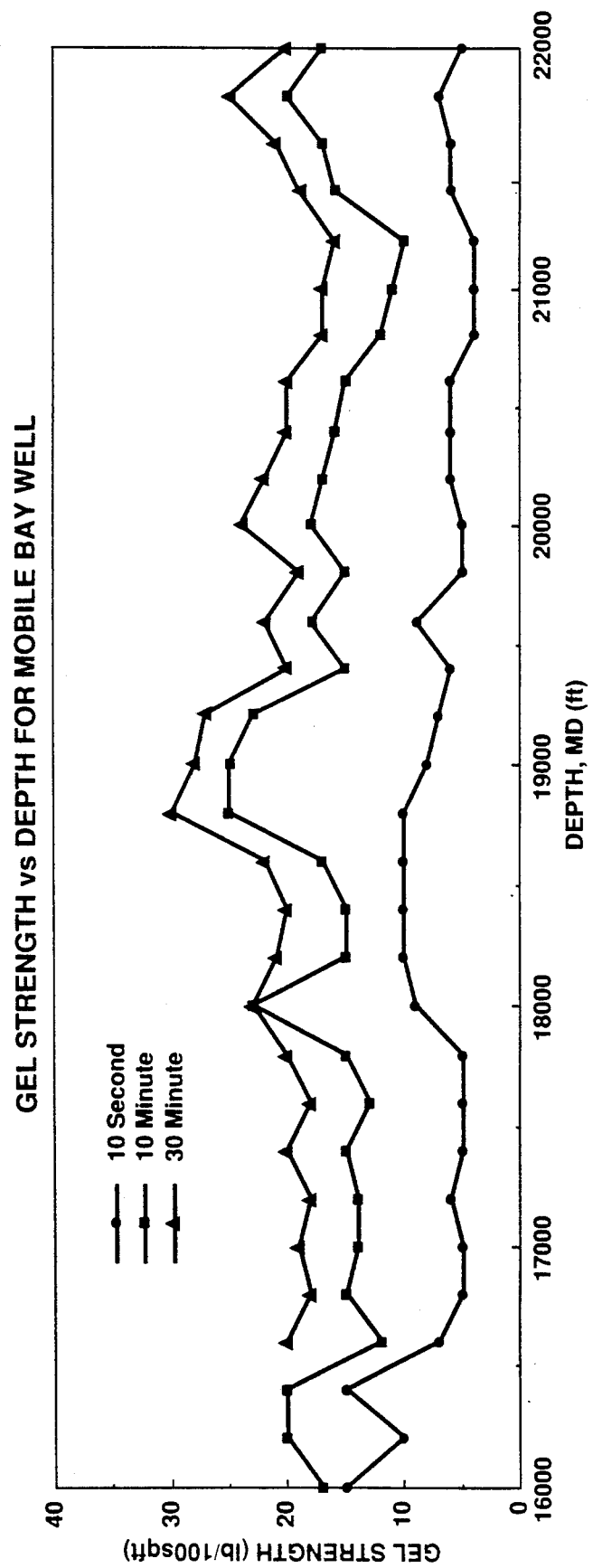
FIG. 8A is a graph of the gel strengths as a function of drilling depth for a field application of a mud of this invention as further described in Example 8.
Figure 8B:
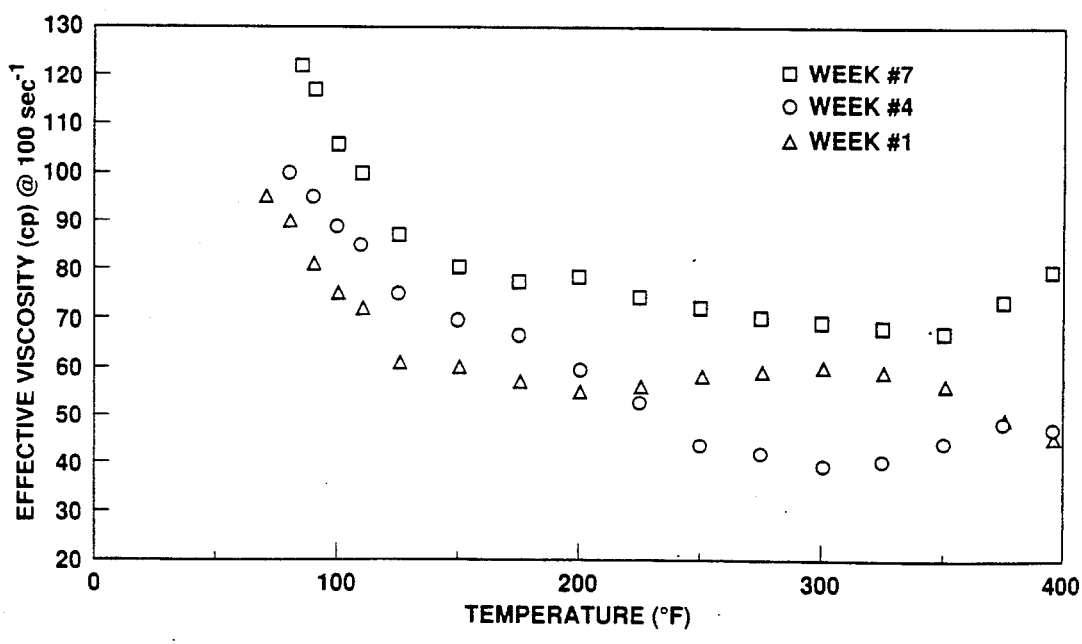
FIG. 8B is a graph of the viscosity of this mud as a function of temperature, sampled at various time intervals during the drilling of the well described in Example 8.

The drilling fluid was mixed using principles well known in the art. The fluid contained 110 lb/bbl barite, 10 lb/bbl prehydrated Aquagel Gold Seal, 1.0 lb/bbl caustic for a pH of 10.8, 2 lb/bbl presheared PCC, 2 lb/bbl Therma-Chek, and sack salt to give a chloride concentration of 10,000 mg/L. The maximum mud weight was 11.2 lb/gallon. The concentration of bentonite, as calculated by material balance, began at 10 lb/bbl and was reduced during drilling to 5 lb/bbl, as the well depth, and therefore temperature, increased. During drilling, PCC remained constant at 2 lb/bbl and Therma-Chek filtration polymer was increased to 4 lb/bbl. Miltemp deflocculant was added gradually to a concentration of 1 lb/bbl. FIG. 8A contains a plot of the measurement of gel strength of the mud of this invention as a function of depth for the duration of the well in which the mud of this invention was used. FIG. 8B contains Fann 50C Viscometer tests on three different field samples from this well.

Table 7 demonstrates the minimal daily treatment level required by the mud of this invention in the drilling of this well as compared to typical treatment levels of an offset well using a mud of the prior art. Table 8 shows that the properties of the mud of this invention generally stayed within the prescribed ranges throughout the drilling of this well.

EXAMPLE 9

This invention has also been used at a drilling site in East Texas. The bottomhole temperature of that well at 18,500 feet was 360° F. The density of the drilling fluid was about 15.4 lb/gallon. This fluid was blended from two earlier mud systems used in drilling the same well, rather than being newly built as was the mud in the preceding Example. One of these earlier mud systems was a fresh water drilling fluid, and the other was a salt-saturated drilling fluid used to drill through a 3,000 foot section of Lou Ann salt near 12,500 feet. These two fluids were blended to build the 30,000 mg/L chloride fluid used for drilling the high temperature portion of this well. Since salt stringers were encountered during drilling, the salinity of the fluid at the bottom of the well was 125,000 mg/L.

Figure 9:
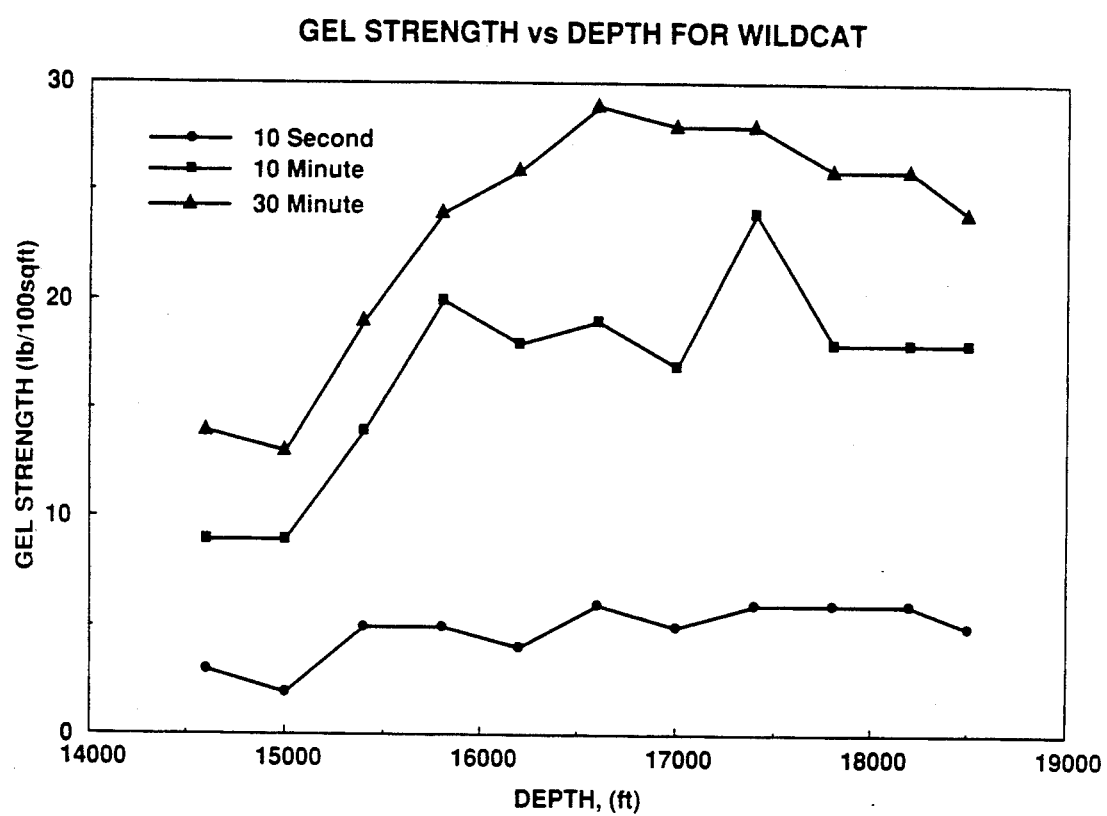
FIG. 9 is a graph of the gel strengths as a function of drilling depth for a field application of a mud of this invention as further described in Example 9.

The composition of this drilling fluid was 350 lb/bbl barite, 5 lb/bbl prehydrated Aquagel Gold Seal, 1 lb/bbl presheared PCC, 2 lb/bbl Chemtrol X, 1 lb/bbl Pyrotrol, 1 lb/bbl caustic for a pH of 10.5, and 1 lb/bbl Miltemp. Performance of the fluid was virtually trouble-free. There were no sticking incidents or other mud instability problems despite the large increase in chlorides near the bottom of the hole. FIG. 9 contains a graph of the gel strengths of the fluid as a function of depth for the duration of the well. Results of laboratory tests performed on samples from this well are summarized in Table 9.

The above description and examples of the invention are offered only for the purpose of illustration, and it is not intended that the invention be limited except by the scope of the appended claims.

TABLE 1

|  | Fluid 1A | Fluid 1B |
|---|---|---|
| Prehydrated Aquagel, lb/bbl | 6 | 6 |
| Presheared PCC, lb/bbl | 2 | 2 |
| Drilled Solids, vol. % | 6.5 | 6.5 |
| Deflocculants |  |  |
| Desco CF, lb/bbl | 2 | 2 |
| Miltemp, lb/bbl | 1 | 1 |
| Filtration Material |  |  |
| Filtrex, lb/bbl | 20 | 20 |
| KemSeal, lb/bbl | 2 | 2 |
| Chloride (from Sea Salt), ppm | 16,000 | 0 |
| Fluid Density, lb/gal | 13 | 13 |
| pH | 10.5 | 10.5 |
| Yield Point, lb/100 ft$^2$ | 16 | 12 |
| Gel Strengths, lb/100 ft$^2$ |  |  |
| 10-second | 11 | 3 |
| 10-minute | 26 | 24 |
| 30-minute | 38 | 41 |
| HTHP filtration rate, cc/30 min. | 16 | 16 |

TABLE 2

|  | Fluid 2A | Fluid 2B | Fluid 2C |
|---|---|---|---|
| Prehydrated Aquagel, lb/bbl | 8 | 8 | 8 |
| Presheared PCC, lb/bbl | 2 | 2 | 2 |
| Drilled Solids, vol. % | 6.5 | 6.5 | 6.5 |
| Deflocculant |  |  |  |
| Therma-Thin, lb/bbl | 4 | 4 | 4 |
| Filtration Material |  |  |  |
| Filtrex, lb/bbl | 20 | 20 | 20 |
| KemSeal, lb/bbl | 2 | 2 | 2 |
| Chloride (from Sea Salt), ppm | 16,000 | 8,000 | <1,000 |
| Fluid Density, lb/gal | 11 | 11 | 11 |
| pH | 10.0 | 10.0 | 10.0 |
| Yield Point, lb/100 ft$^2$ | 7 | 9 | 19 |
| Gel Strengths, lb/100 ft$^2$ |  |  |  |
| 10-second | 3 | 3 | 3 |
| 10-minute | 9 | 15 | 57 |
| 30-minute | 15 | 27 | 78 |
| HTHP Filtration Rate, cc/30 min. | 16 | 14 | 14 |

TABLE 3

|  | Fluid 3A | Fluid 3B | Fluid 3C | Fluid 3D | Fluid 3E |
|---|---|---|---|---|---|
| Prehydrated Aquagel, lb/bbl | 8 | 8 | 8 | 8 | 8 |
| Presheared PCC, lb/bbl | 2 | 2 | 2 | 2 | 2 |
| Drilled Solids, vol. % | 6.5 | 6.5 | 6.5 | 6.5 | 6.5 |
| Deflocculants |  |  |  |  |  |
| Desco CF, lb/bbl | 2 | 2 | 2 | 2 | 2 |
| Miltemp, lb/bbl | 1 | 1 | 1 | 1 | 1 |
| Filtration Material |  |  |  |  |  |
| Therma-Chek, lb/bbl | 4 | 4 | 4 | 4 | 4 |
| Chloride (from Sea Salt), ppm | 4,000 | 7,500 | 15,200 | 30,800 | 58,500 |
| Fluid Density, lb/gal | 11.0 | 11.0 | 11.0 | 11.0 | 11.3 |
| pH | 11.0 | 11.0 | 11.0 | 11.0 | 11.0 |
| Yield Point, lb/100 ft$^2$ | 21 | 11 | 11 | 11 | 24 |
| Gel Strengths, lb/100 ft$^2$ |  |  |  |  |  |
| 10-second | 4 | 4 | 3 | 3 | 12 |
| 10-minute | 14 | 18 | 12 | 12 | 17 |
| 30-minute | 27 | 37 | 27 | 19 | 27 |
| HTHP Filtration Rate, cc/30 min. | 23 | 25 | 29 | 35 | 35 |

TABLE 4

|  | Fluid 4A | Fluid 4B | Fluid 4C | Fluid 4D | Fluid 4E | Fluid 4F |
|---|---|---|---|---|---|---|
| Prehydrated Aquagel, lb/bbl | 12 | 12 | 8 | 4 | 8 | 6 |
| Presheared PCC, lb/bbl | 0 | 0 | 2 | 2 | 1 | 1.5 |
| Drilled Solids, vol. % | 3 | 6.5 | 6.5 | 6.5 | 6.5 | 6.5 |
| Deflocculants |  |  |  |  |  |  |
| Desco CF, lb/bbl | 2 | 2 | 2 | 2 | 2 | 2 |
| Miltemp, lb/bbl | 1 | 1 | 1 | 1 | 1 | 1 |
| Filtration Material |  |  |  |  |  |  |
| Filtrex, lb/bbl | 20 | 20 | 20 | 20 | 20 | 20 |
| KemSeal, lb/bbl | 2 | 2 | 2 | 2 | 2 | 2 |
| Chloride (from Sea Salt), ppm | 16,000 | 23,000 | 16,000 | 16,000 | 16,000 | 16,000 |
| Fluid Density, lb/gal | 13 | 13 | 13 | 13 | 13 | 13 |
| pH | 10.0 | 10.4 | 10.6 | 10.2 | 10.5 | 10.3 |
| Yield Point, lb/100 ft$^2$ | 16 | 23 | 71 | 10 | 31 | 14 |
| Gel Strengths, lb/100 ft$^2$ |  |  |  |  |  |  |
| 10-second | 12 | 17 | 43 | 8 | 15 | 4 |
| 10-minute | 23 | 31 | 46 | 15 | 29 | 10 |
| 30-minute | 29 | 36 | 48 | 18 | 35 | 14 |
| HTHP Filtration Rate, cc/30 min. | 21 | 19 | 20 | 16 | 16 | 17 |

TABLE 5

|  | Fluid 6A | Fluid 6B | Fluid 6C |
|---|---|---|---|
| Prehydrated Aquagel, lb/bbl | 8 | 8 | 10 |
| Presheared PCC, lb/bbl | 2 | 0 | 2 |
| Drilled Solids, vol. % | 6.5 | 6.5 | 6.5 |
| Deflocculant |  |  |  |
| Therma-Thin, lb/bbl | 4 | 4 | 4 |
| Filtration Material |  |  |  |
| Filtrex, lb/bbl | 20 | 20 | 20 |
| KemSeal, lb/bbl | 2 | 2 | 2 |
| Chloride (from Sea Salt), ppm | 16,000 | 16,000 | 16,000 |
| Fluid Density, lb/gal | 11 | 11 | 11 |
| pH | 10.3 | 10.2 | 10.2 |
| Yield Point, lb/100 ft$^2$ | 7 | 1 | 11 |
| Gel Strengths, lb/100 ft$^2$ |  |  |  |
| 10-second | 3 | 1 | 5 |
| 10-minute | 9 | 1 | 12 |
| 30-minute | 15 | 3 | 18 |
| HTHP Filtration Rate, cc/30 min. | 16 | 17 | 17 |

TABLE 6

| | Fluid 7A | Fluid 7B | Fluid 7C | Fluid 7D | Fluid 7E |
|---|---|---|---|---|---|
| Prehydrated Bentonite, lb/bbl | 10 | — | 25 | 12 | 6 |
| Presheared Nontreated bentonite, lb/bbl | — | 13 | — | — | — |
| Presheared PCC, lb/bbl | — | — | — | — | 2 |
| Drilled Solids, vol. % | 6.5 | 6.5 | 6.5 | 6.5 | 6.5 |
| Deflocculants | | | | | |
| Desco CF, lb/bbl | — | — | 4 | 2 | 2 |
| Melanex-T, lb/bbl | — | 12 | — | — | — |
| Therma-Thin, lb/bbl | 5 | — | — | — | — |
| Aktaflo-S, lb/bbl | 6 | — | — | — | — |
| Miltemp, lb/bbl | — | — | — | 1 | 1 |
| Filtration Control | | | | | |
| Lignite, lb/bbl | 15 | — | 4 | — | — |
| Soltex, lb/bbl | — | — | 4 | — | — |
| Dristech HTHP, lb/bbl | — | — | 20 | — | — |
| HT Rez, lb/bbl | — | 8 | — | — | — |
| Baranex, lb/bbl | 5 | — | — | — | — |
| Therma-Chek, lb/bbl | 2.5 | — | — | — | — |
| Filtrex, lb/bbl | — | — | — | 20 | 20 |
| KemSeal, lb/bbl | — | — | — | 2 | 2 |
| Chloride (with NaCl), mg/L | 23,000 | 0 | 20,000 | 19,000 | 16,000 |
| Fluid Density, lb/gal.8 | 12.8 | 13.0 | 12.9 | 13.0 | 13.0 |
| pH | 10.0 | 11.0 | 10/5 | 10.0 | 10.5 |
| Yield Point, lb/100 ft$^2$ | 45 | 8 | 101 | 8 | 16 |
| Gel Strengths, lb/100 ft$^2$ | | | | | |
| 10-second | 32 | 7 | 102 | 9 | 11 |
| 10-minute | 50 | 58 | 122 | 52 | 26 |
| 30-minute | 69 | 59 | 171 | 54 | 38 |
| HTHP Filtration Rate, cc/30 min. | 49 | 19 | 11 | 24 | 16 |

TABLE 7

Daily Treatments for a Typical Mobile Bay Well and the Mobile Bay Well using the mud of this invention, at depth of 19,000–21,000 feet; 3,000 bbl system total.

| | Prior Art | Fluid of This Invention |
|---|---|---|
| Barite, lb/bbl/day | 10 | 7 |
| Prehydrated Clay, lb/bbl/day | 1.2 | 0.15 |
| Presheared PCC, lb/bbl/day | 0 | 0.13 |
| Caustic, lb/bbl/day | 0.4 | 0.14 |
| Deflocculant, lb/bbl/day | 0.3 | 0.05 |
| Filtration Additive, lb/bbl/day | 1.0 | 0.2 |
| Water, bbl/day | 300 | 170 |

TABLE 8

Typical Properties of the Fluid of this Invention as used in the Mobile Bay well.

| | |
|---|---|
| pH | 10.5–11.0 |
| Yield Point, lb/100 ft$^2$ | 15–23 |
| Gel Strengths | |
| 10-second, lb/100 ft$^2$ | generally 5–10 |
| 10-minute, lb/100 ft$^2$ | generally 10–20 |
| 30-minute, lb/100 ft$^2$ | generally 18–25 |
| HTHP Filtration Rate, cc/30 min. | generally 20–40 |

TABLE 9

Typical Properties of the Fluid of this Invention as used in the East Texas well.

| | |
|---|---|
| pH | 9.5–10.5 |
| Yield Point, lb/100 ft$^2$ | 10–15 |
| Gel Strengths | |
| 10-second, lb/100 ft$^2$ | generally 4–7 |
| 10-minute, lb/100 ft$^2$ | generally 10–20 |
| 30-minute, lb/100 ft$^{22}$ | generally 12–29 |

TABLE 9-continued

Typical Properties of the Fluid of this Invention as used in the East Texas well.

| | |
|---|---|
| HTHP Filtration Rate, lb/100 ft$^2$ | generally 30–35 |

What is claimed is:

1. A water-based drilling fluid, comprising: a chloride salt selected from the group consisting of sodium chloride, potassium chloride, magnesium chloride, or a mix thereof; parenchymal cell cellulose and clay; wherein the concentration of said chloride salt is between about 5,000 and about 110,000 parts of chloride per million parts of said drilling fluid.

2. A water-based drilling fluid, comprising: a chloride salt, parenchymal cell cellulose and clay; wherein said chloride salt substantially comprises sodium chloride and the concentration of said chloride is between about 5,000 and about 110,000 parts of chloride per million parts of said drilling fluid.

3. A water-based drilling fluid, comprising: a chloride salt selected from the group consisting of sodium chloride, potassium chloride, magnesium chloride, or a mix thereof; parenchymal cell cellulose; and clay; wherein the concentration of said chloride salt is between about 10,000 and about 30,000 parts of chloride per million parts of said drilling fluid; the concentration of said parenchymal cell cellulose is between about 1.0 and about 3.0 pounds per barrel; and the concentration of said clay is between about 5 and about 10 pounds per barrel.

4. A water-based drilling fluid, comprising: chloride salt, parenchymal cell cellulose and clay; wherein said chloride salt substantially comprises sodium chloride and the concentration of said chloride is between about 10,000 and about 30,000 parts of chloride per million parts of said drilling fluid.

5. A water-based drilling fluid, comprising: potassium chloride salt; parenchymal cell cellulose; and clay; wherein the concentration of said potassium chloride salt is between about 10,000 and about 30,000 parts of chloride per million parts of said drilling fluid; the concentration of said parenchymal cell cellulose is between about 1.0 and about 3.0 pounds per barrel; and the concentration of said clay is between about 5 and about 10 pounds per barrel.

6. A water-based drilling fluid, comparing: sea water; parenchymal cell cellulose; and clay; wherein the concentration of chloride in said drilling fluid is between about 10,000 and about 30,000 parts of chloride per million parts of said drilling fluid.

7. A water-based drilling fluid, comprising: a sodium chloride salt; parenchymal cell cellulose; and clay; wherein the concentration of said sodium chloride salt is between about 10,000 and about 30,000 parts of chloride per million parts of said drilling fluid; the concentration of said parenchymal cell cellulose is between about 1.0 and about 3.0 pounds per barrel; and the concentration of said clay is between about 5 and about 10 pounds per barrel.

8. The drilling fluid of claim 7 wherein the clay is bentonite.

9. The drilling fluid of claim 7 wherein the parenchymal cell cellulose is presheared.

10. The drilling fluid of claims 7 wherein the clay is prehydrated.

11. The method of drilling a well comprising:
 a) Preparing the drilling fluid of claim 7; and
 b) circulating said fluid through a wellbore while drilling said wellbore, so as to bring said fluid into contact with the surface defining said wellbore.

* * * * *